US008192212B2

(12) United States Patent
Casses et al.

(10) Patent No.: US 8,192,212 B2
(45) Date of Patent: Jun. 5, 2012

(54) ELECTRICAL CONNECTOR SYSTEM WITH TEMPORARILY BLOCKING DURING UNMATING OF TWO CONNECTORS

(75) Inventors: Claude Casses, Clevilliers (FR); Patrice Cappe, Faverolles (FR); Stephane Trancart, Faverolles (FR); Thomas Pabst, Herzogenaurach (DE); Rainer Schmidt, Nuremberg (DE)

(73) Assignee: FCI Automotive Holding, Guyancourt (FR)

( * ) Notice: Subject to any disclaimer, the term of this patent is extended or adjusted under 35 U.S.C. 154(b) by 0 days.

(21) Appl. No.: 12/737,665

(22) PCT Filed: Aug. 4, 2009

(86) PCT No.: PCT/EP2009/060120
§ 371 (c)(1),
(2), (4) Date: Mar. 21, 2011

(87) PCT Pub. No.: WO2010/015641
PCT Pub. Date: Feb. 11, 2010

(65) Prior Publication Data
US 2011/0171843 A1    Jul. 14, 2011

(30) Foreign Application Priority Data

Aug. 4, 2008 (WO) .................. PCT/IB2008/054462
Aug. 4, 2008 (WO) .................. PCT/IB2008/054464
Aug. 4, 2008 (WO) .................. PCT/IB2008/054467

(51) Int. Cl.
*H01R 13/53* (2006.01)

(52) U.S. Cl. ..................................... 439/181

(58) Field of Classification Search .......... 439/188, 439/101, 181
See application file for complete search history.

(56) References Cited

U.S. PATENT DOCUMENTS

| 3,270,267 A | 8/1966 | Nolte, Jr. .................. 320/56 |
| 4,775,327 A | 10/1988 | Normann et al. .............. 439/140 |
| 5,336,934 A * | 8/1994 | Toepfer et al. ............... 307/10.1 |
| 5,769,650 A | 6/1998 | Aoyama et al. ............... 439/189 |
| 6,753,624 B2 * | 6/2004 | Miwa ............................ 307/112 |
| 7,021,950 B2 * | 4/2006 | Borrego Bel et al. ......... 439/181 |
| 7,241,155 B2 * | 7/2007 | Tyler .............................. 439/157 |
| 7,568,927 B2 * | 8/2009 | Hughes et al. ................ 439/181 |
| 7,722,389 B2 * | 5/2010 | Benoit et al. .................. 439/535 |
| 7,789,690 B1 * | 9/2010 | Rhein ........................... 439/310 |
| 7,854,623 B2 * | 12/2010 | Radenne et al. ............... 439/489 |
| 7,946,870 B2 * | 5/2011 | Hughes et al. ................ 439/181 |
| 2005/0048816 A1 * | 3/2005 | Higgins ........................ 439/101 |
| 2006/0040565 A1 * | 2/2006 | Chen ............................ 439/677 |
| 2008/0102668 A1 | 5/2008 | Ikeya et al. .................. 439/157 |
| 2008/0132098 A1 | 6/2008 | Tyler et al. ................... 439/157 |

FOREIGN PATENT DOCUMENTS

| EP | 0 615 312 A2 | 9/1994 |
| EP | 0 665 454 A1 | 8/1995 |
| GB | 2 218 277 A | 11/1989 |
| JP | 3-285524 | 12/1991 |
| WO | WO 00/46881 | 8/2000 |

* cited by examiner

*Primary Examiner* — Chandrika Prasad
(74) *Attorney, Agent, or Firm* — Harrington & Smith

(57) ABSTRACT

The present invention relates to a method for unmating an electrical connector assembly wherein the movement for unmating the first and second connectors is temporarily blocked after interlocking contacts are disconnected and before the power contacts are disconnected. The invention also relates to a connector system and a connector assembly offering such functions.

33 Claims, 26 Drawing Sheets

ELECTRICAL CONNECTOR SYSTEM WITH TEMPORARILY BLOCKING DURING UNMATING OF TWO CONNECTORS

1. FIELD OF THE INVENTION

The invention relates to electrical connector systems, for instance power connector assemblies for electricity-fuel hybrid driven or fully electrically driven vehicles, with additional safety functions as well as methods for a safe mating and unmating of such connectors.

2. TECHNICAL BACKGROUND

Electrical motors of electricity-fuel hybrid driven vehicles or fully electrically driven vehicles are powered supplied by batteries through cables, with high currents and/or voltages. For security reasons, it is required that little or no electrical current flows in the power contacts during connecting or disconnecting these cables or in other word during the unplugging of the connectors of the power circuit comprising these cables.

Upon unmating of a connector from a corresponding counter connector in the case of electrical power lines with high current and/or voltages undesired and potentially dangerous electrical arching can occur when the electrical contact terminals arranged in the connector housings are disconnected from each other. Therefore, in cases with high current and/or voltage it is usually necessary to switch-off the power supply before for example an electrical power connector is unmated. This procedure is error-prone since an operator trying to unmate a power connector from for example its corresponding socket may not know the correct procedure or ignored it to save time and effort. Further, in case of emergency it is often not possible or there is not enough time to follow the correct unmating procedure and to actuate for example a switch before unmating a connector system. Therefore, it would be highly desirable to have a connector system which can be used for high power applications and which can be safely unmated without any actuating of additional emergency switches and which can safely be unmated by untrained personal, as for example emergency services, without the necessity to study operating instructions. In other words, it would be desirable to have such a connector system with the desired safety function which is designed such that an operator trying to unmate the connector will inevitably and naturally perform the necessary manual operations such that a potential dangerous arching can be avoided.

Such a connector system is in particular desirable for applications with electricity-fuel hybrid driven vehicles or fully electrically driven vehicles, since the electrical power used in such vehicles is considerably higher than the currents and/or voltages usually used in ordinary fuel driven passenger vehicles. If such a hybrid vehicle is for example involved in an accident or has to undergo an ordinary vehicle service it is for safety reasons required that the electrical power circuit of the car is safely deactivated. Although a switch for such a purpose might be adequate for service situations in a garage, it is not as suitable for emergency situations, since for example a switch might be damaged in a car accident or it might be blocked and cannot be actuated. Further, it should be noted that for the high currents and/or voltages occurring in such hybrid vehicle applications such a switch necessarily has to have a substantial size and thus requires a large space in for example an engine compartment.

It is therefore an object of the present invention to provide a connector system or assembly which offers an integrated safety function in particular in view of the mating and unmating processes in case of electrical power lines and which avoids the disadvantages of the prior art. It is a further object of the invention to offer a connector system and a method for unmating of such connectors which allows a safe, yet simple unmating process which is preferably self explanatory for the operator and which does e.g. not require any instructions or training. It is a further object of the invention to achieve all the above with a connector system, which is particularly cost efficient and fail proof. Still further, it is an object of the invention to provide a connector system and a method which improves the safety situation of passenger vehicles with high current electrical power systems, as they are typically found in hybrid or electrical vehicles.

These and other objects, which will become apparent on reading the following description, are solved by the connector systems and methods according to the independent claims.

3. SUMMARY OF THE INVENTION

Thanks to the invention, a time out it is introduced in the unplugging movement so as to ensure that the power contacts are powered off before being unmated.

The advantage of an example method is that the operator cannot unmate the two connectors only by separating them along the mating axis. The operator also needs to action an unblocking element, which requires a movement that is different from a translation along the mating axis of the second connector away from the first connector, and which requires some time (for instance at least one second). In this way, when the blocked position is set to occur when the power contacts are disconnected from the power source, but still connected to each other, the current flow can decrease by flowing from one of the power contacts towards the other, so that, when the power contacts are disconnected from each other, the risk of electrical arc between the two power contacts is very low.

According to a possible aspect of the invention, it is possible to mate the power male and female connectors with a unique plugging movement along a unique mating axis. The interlocking contacts are mated during the same axial movement, during a second portion of the plugging movement, after having executed a first portion of the plugging movement, when the power contacts are mated. Then it becomes possible to connect the power contacts to a power source through a power switch, and to connect the interlocking contacts to the power switch, in order to control the power switch. Because the interlocking contacts are connected or disconnected only when the power contacts are connected, the power switch connects/disconnects the power contacts to/from the power source when they are connected to each other, thereby ensuring that few or no electrical current flows in the power contacts during connection or disconnection.

Thanks to an example inventive method it becomes possible to compensate tolerances, gaps, clearances and plays of the different connector assembly components and to be sure that the interlocking contacts are connected only once the power contacts are mated. Indeed, a third portion of the plugging movement is intercalated between the first and second plugging movement portions. This third plugging movement portion ensures that the power contacts are already mated when the interlocking contacts are connected. The length corresponds to at least the some of the tolerances of the different connector assembly components that can have an effect on the mating of the power contacts.

An advantage of an example method is to provide a time out and to ensure that the power contacts are unpowered before they are disconnected.

An advantage of an example method is to provide for unblocking means that forces an operator to actuate means in a movement that is different from the unplugging or unmating movement and/or a handling position that is different from the one used during the initial portion of the unplugging or unmating movement.

An example electrical connector assembly has the advantage to control the electrical connection of the interlocking contacts with an element having a shape and in a material which can be specifically designed and optimized for this purpose.

An example electrical connector assembly has the advantage to Provide separating means, so that the position of the first and second connectors with respect to each other, in which the resilient. arm comes into contact with the interlock contact, is independent from the exact location of the interlock contact in the first connoctor, and the errors or tolerances in the form of the interlock contact, in particular with its length.

According to a further aspect of the invention, a connector system is provided comprising a connector, a corresponding counter connector and locking means to lock connector and counter connector with each other. The connector is for example a plug connector and the counter connector is for example a corresponding socket. The connector system is in particular suitable for applications in a passenger vehicle, and in particular in a hybrid vehicle or an electrically driven vehicle. The locking means comprises an actuating means for the release of the locking between connector and counter connector. The actuating means is preferably adapted to be actuated manually by an operator. The locking means of the invention offers a double-locking mechanism and is accordingly provided with first and second locking members, as for example locking protrusions provided on the counter connector, which are adapted to cooperate with locking means assigned to the actuating means. The locking means may be integrally formed with a part of the actuating means or the actuating means may for example be a separate part, which indirectly interacts with the locking means. The first locking member is arranged and adapted to interact with the locking means such that the connector and counter connector can be locked in a first locking position, preferably the fully locked position. The second locking member is arranged and adapted to provide a second locking position for the connector and counter connector. By means of the same actuating means the locking in the first and the second position can be released to unmate the connector from the counter connector. However, it is not possible to unmate the connector by a single movement, i.e. to move the connector from the first locking position via the second locking position directly to the fully unmated condition, but once the first locking position is left, the actuating means is moved into its initial position thereby interacting with the second locking means and stopping the unmating motion of connector and counter connector. In the second position it is therefore necessary to actuate the actuating means for a second time, to also release the second locking position and to enable a full unmating of the connectors from each other. To this end, the locking means may be further provided with guiding means, which interact with the actuating means upon movement from the first locking position to the second locking position to automatically force the locking means assigned to the actuating means into engagement with the second locking members.

In a preferred embodiment, a first locking position is spaced from the second locking position in the mating direction of connector and counter connector. Preferably, the actuating means is provided in the form of an actuating arm, which is attached—most preferably—by integrally forming it with a part of the housing of connector or counter connector and the locking members are preferably provided on the respective other of the connector or counter connector. The actuating arm is most preferably hinged to for example the connector housing such that it can be moved manually to release the locking between connector and counter connector. In its initial position the actuating means is preferably in a locking position, which has to be actively overcome by actuating the actuating means.

Due to the double locking mechanism it is not possible to unmate the connector system according to the invention in a single stroke. Instead, an operator has to actuate the actuating means to overcome the first locking position. Thereby, upon movement from the first locking position in the direction of unmating of connector and counter connector system, the actuating means is moved automatically again into its initial position, i.e. into a position, whereby it engages the second locking means and stops the unmating motion of the connector. Thereby, the unmating movement is disrupted and the operator will have to press the actuating means again to overcome the second locking position and to fully unmate connector and counter connector. In alternative embodiments, the actuating means is blocked by the second locking means without being moved automatically into its initial position. In this case, the operator will have to release is for overcoming the blocking by the second locking means. In any case, the unmating process is slowed down which gives e.g. the electrical system sufficient time to run down, so that arching can be avoided. The interruption of the unmating process can be used in various ways to improve the safety of the unmating process and to avoid arching in case of high currents and/or high voltages in electrical power lines. For example, in a preferred embodiment of the invention, the connector and counter connector are provided with appropriate signal means, which detect when the connector is moved from the first to the second locking position and send a corresponding detection signal to a control device, which then automatically disrupts the electrical circuit. In such a case, the contacts provided in connector and counter connector are still in electrical contact with each other in the second locking position. Although the application in connection with high current and/or high voltage power lines is particularly preferred, the intended main application the invention is not limited thereto. The principle of the invention may e.g. also be used to send a warning signal to electronic control equipment when a connector is (e.g. mistakenly) unmated, to allow e.g. an emergency storage of certain data in the split second the unmating process is interrupted. Alternatively, the electrical connection between the contacts inside of connector and counter connector is disrupted when the connector reaches the second locking position.

In a most preferred embodiment of the invention, the connector is a service plug for the electrical power circuit of a passenger vehicle. By means of unplugging or unmating the service plug, the electrical power circuit of the vehicle is disrupted. In other words, the service plug does not provide a connection with another electrical device but it is rather a "bridging" part for the electrical power circuit. Therefore the service plug e.g. essentially comprises a housing and two electrical terminals arranged therein, which are adapted to be in electrical contact with the power terminals of a corresponding connector, which is preferably provided in or at the passenger vehicle. The two electrical terminals of the service plug contact terminals inside of the connector. They are in electrical connection with each other, preferably via a safety fuse. Thus, the service plug enables to open and close the electrical power circuit of a vehicle. The service plug can for example be arranged in the engine compartment of a vehicle and provided with a distinctive color, as for example orange or red, to indicate to an operator were to pull to disable the electrical power circuit. Thus, instead of cumbersomely branch off the car batteries or to handle a large power switch, which may be damaged or destroyed in case of an accident, an operator merely has to pull the service plug to disable the power circuit.

The present invention offers the advantage that an operator will naturally and without having been told so actuate the actuating means for a second time upon reaching the stop in the second locking position. Applicants found that when a person tries to unmate the connector and recognizes that the connector system is provided e.g. with an actuating button or an actuating arm he will try to push or actuate this button or arm upon noticing that it is not possible to unmate the connectors by simple force. Since the connector will move for certain distance, namely from the first locking position to the second locking position, the acting person gets a positive feedback and will try the same button or arm again in an attempt to fully unmate the connector. In practice, the unmating of the connectors will only take maybe one second, which is however enough to bring the electrical circuit of a passenger vehicle into a safe condition. Thus, the connector system of the present invention can be considered as fail proof and the design of it ensures that any person, without having detailed information about the construction and operation of the connector, is capable to quickly but yet safely unmate the connector.

4. DESCRIPTION OF THE PREFERRED EMBODIMENTS

The present invention is described exemplarily with reference to the enclosed figures in which FIG. 1 is a three dimensional view of a male electrical connector;

Figure 1:
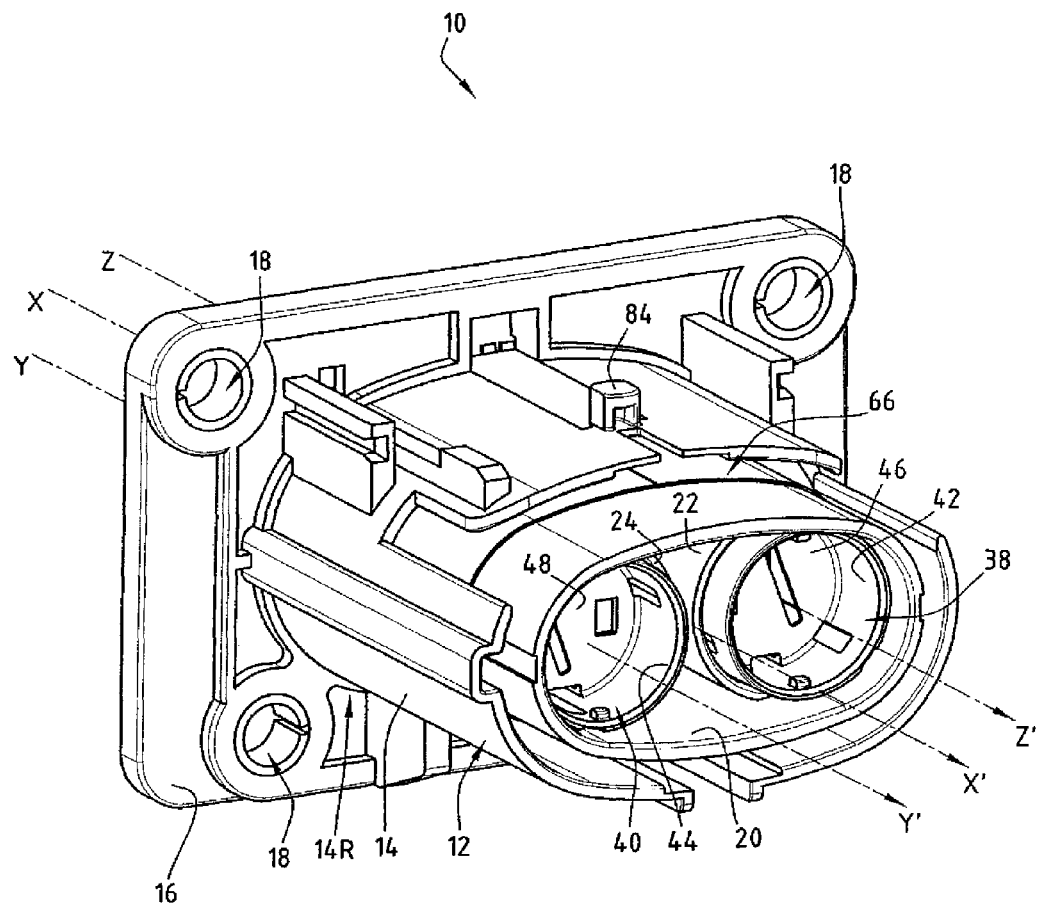
Figure 2:
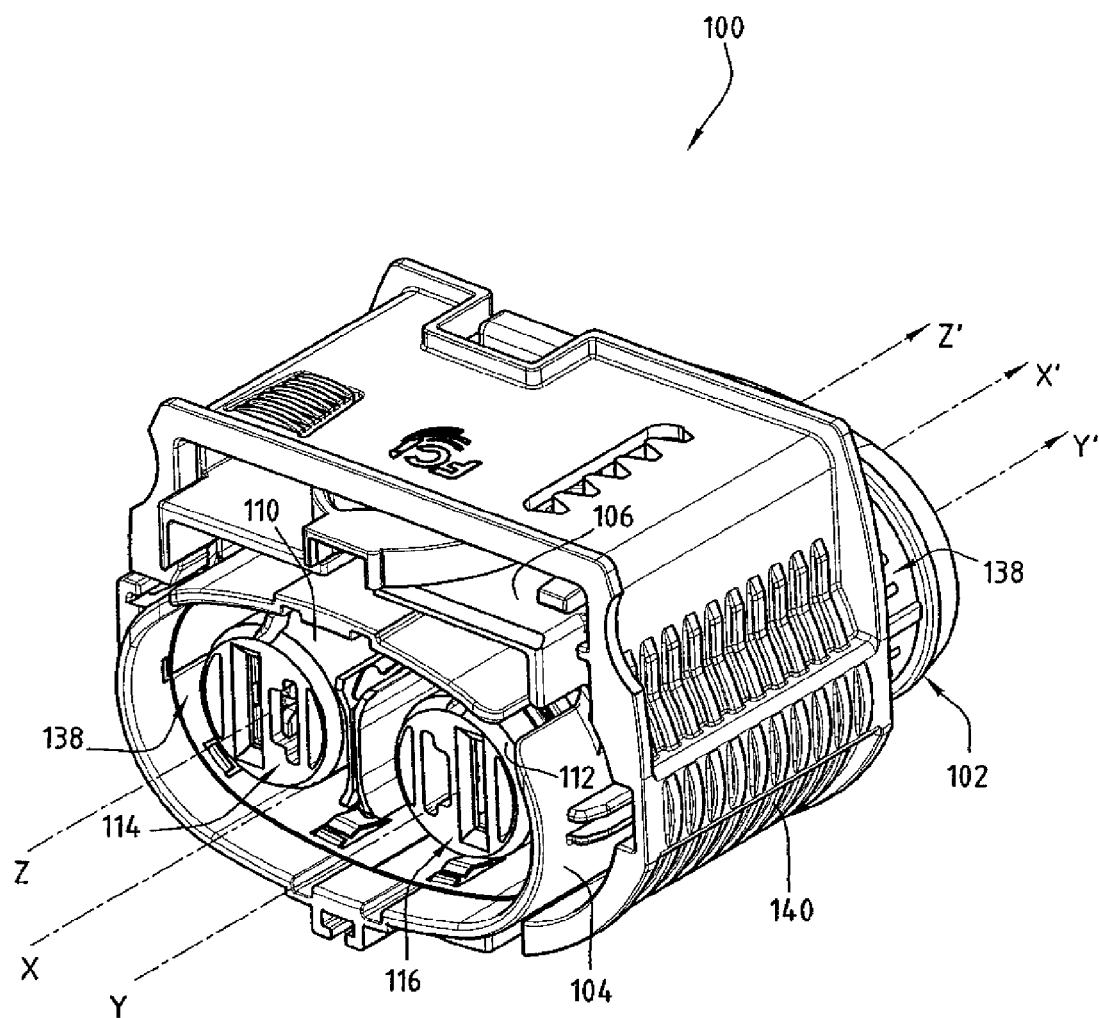
FIG. 2 is a three dimensional view of a female electrical connector, intended to mate with the male electrical connector of FIG. 1 along a mating axis.

A male 10 and a female 100 electrical connectors are respectively illustrated on FIGS. 1 and 2.

The male and female connectors form an electrical connector assembly for D.C. current and 400V voltage, and are intended to mate with each other along a mating axis XX' orientated from the male connector (FIG. 1) towards the female connector (FIG. 2). Referring to FIG. 1, the housing of the male connector comprises an outer 12 and an inner 20 housings. The outer housing 12 comprises a tube 14 with an advantageously oval cross section. The tube 14 extends along the mating axis XX'. The outer housing 12 comprises a rear base flange 16 extending perpendicular to the mating axis XX'. The base flange 16 is fixed to the tube 14, at a rear end 14R of the tube 14. Fixing holes 18 are provided through the base flange 16, in order to fix the outer housing 12, e.g. to a wall.

The inner housing 20 has a tubular shape along the mating axis XX' and extends inside the tube 14 of the outer housing 12.

Figure 4:
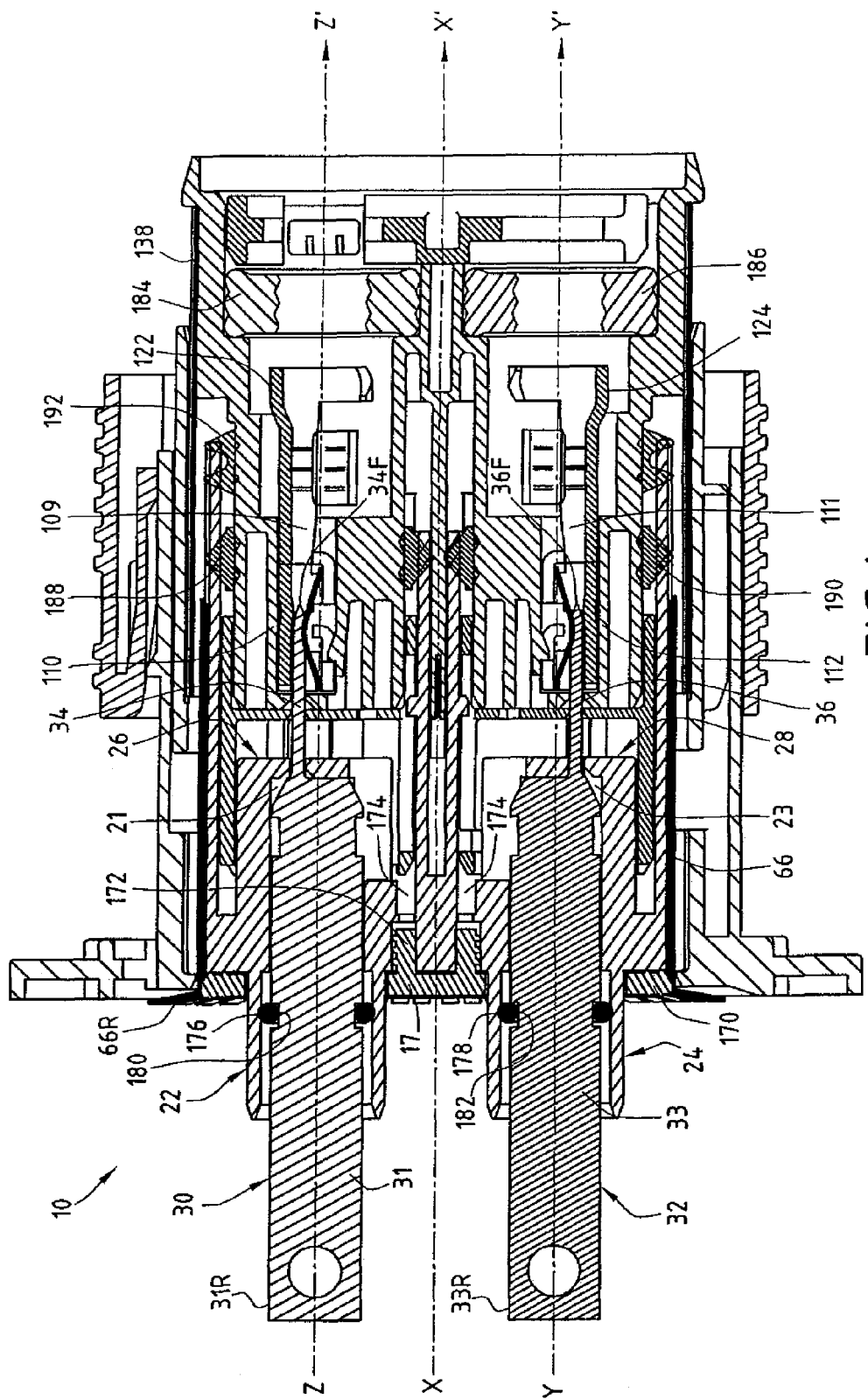
Figure 5:
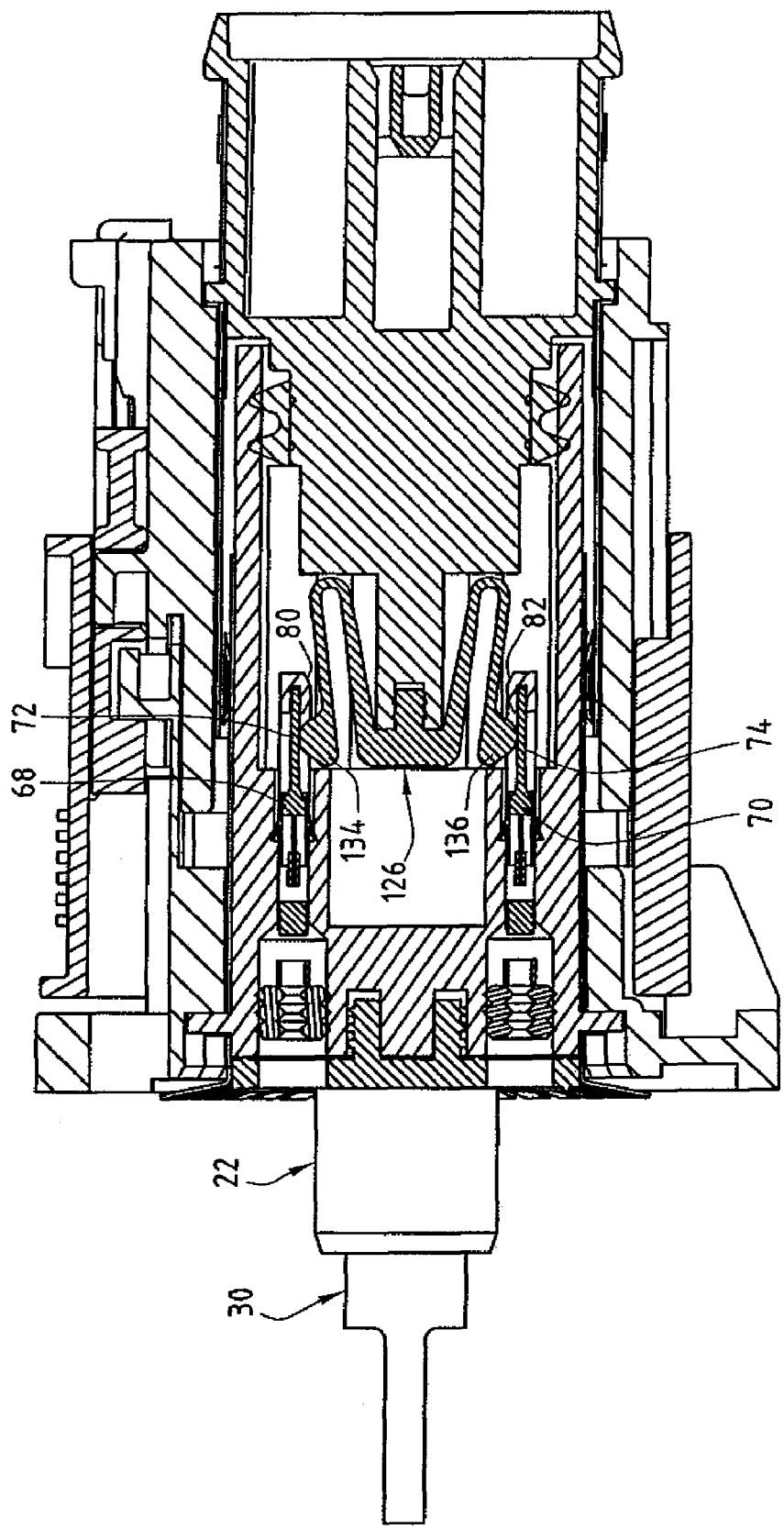
FIGS. 5 and 6 are cross section views of the male and female connectors in a mated position.
Figure 6:
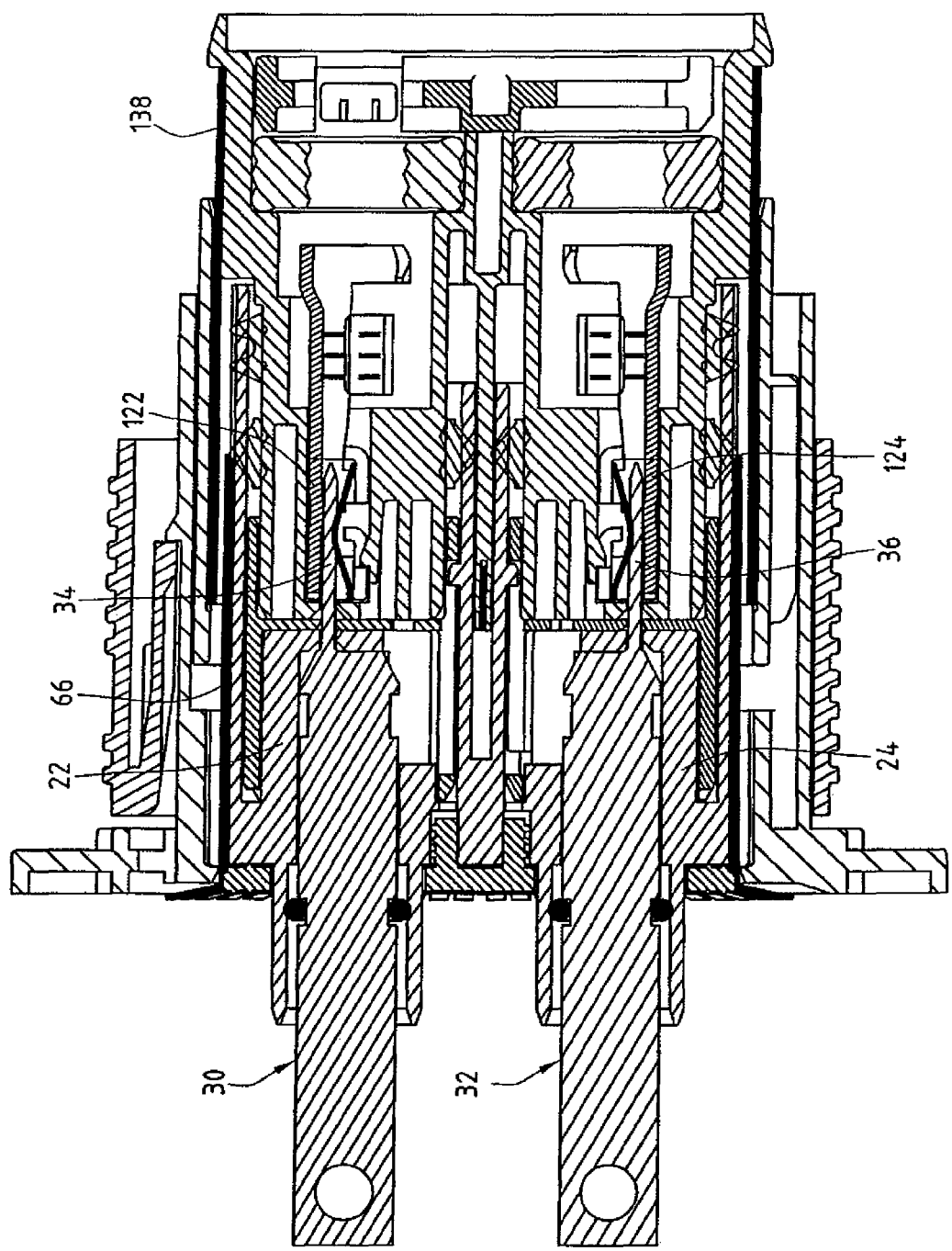

Referring to FIG. 4, the inner housing 20 comprises two cylindrical sleeves 22, 24 extending along a respective axis YY', ZZ', each parallel to the mating axis XX' and each delimitating a respective accommodating chamber 21, 23. Each cylindrical sleeve 22, 24 comprises a respective front face 26, 28, extending perpendicular to the mating axis XX'.

The male electrical connector 10 comprises two male power contacts 30, 32, each accommodated in a respective accommodating chamber 21, 23 and extending along the respective longitudinal axis of the accommodating chamber YY', ZZ'. Each male power contact 30, 32 comprises a cylindrical body 31, 33 and a front plane lance 34, 36 extending frontward from the cylindrical body 31, 33. The cylindrical body 31, 33 projects rearwards with respect to the base flange 16 and comprises a rear end 31R, 33R having, in the illustrated example, a fixation system to a conductive element or (not depicted) a fixation system to a conductive cable. Each front plane lance 34, 36 projects frontward through the respective front face 26, 28, and comprises a front end 34F, 36F.

Referring back to FIG. 1, the male connector 10 comprises two rotary caps 38, 40, each circularly mounted onto a respective circular sleeve 22, 24.

Each rotary cap 38, 40 comprises a guiding cylindrical lateral wall 42, 44, and a protection transversal wall 46, 48. The guiding wall 42, 44 of each rotary cap 38, 40 extends rearwardly and frontwardly with respect to the protection wall 46, 48, and is intended to fit onto the respective cylindrical sleeve 22, 24, so that the rotary cap 38, 40 is able to slide along the respective axis YY', ZZ' and able to rotate around the respective axis YY', ZZ'. The protection wall 46, 48 comprises a rectangular aperture 50, 52 for letting the front plane lance 34, 36 of the respective male power contact 30, 32 pass through.

Referring to FIGS. 7 to 10, the guiding wall 42, 44 comprises a longitudinal groove 54, 56, and a rear trough 58, 60, located adjacent to the groove 54, 56, at a rear part of the lateral wall 42, 44. Each sleeve 22, 24 comprises a longitudinal peg 62, 64 intended to be received selectively in the groove 54, 56. Each one of the longitudinal pegs 62, 64 comprises a finger 62A, 64A designed for engaging a notch 58A, 60A, so as to prevent rotation of rotary caps with vibrations for instance. The fingers 62A, 64A are elastically maintained in the notches 58A, 60A. When the female connector 100 is plugged on the male connector 10, the rotary caps are forced to rotate as it will be explained below. Then, each fingers 62A, 64A gets out of its respective notch 58A, 60A in which it was elastically maintained. The fingers 62A, 64A and the pegs 62, 64 are then moved into the grooves 54, 56, in which they are guided along the axis YY' and ZZ'.

The lateral wall 42, 44 of each rotary cap 38, 40 comprises at least one guiding pin 63, 65 inwardly orientated, i.e. toward the axis YY', ZZ' of the respective accommodating chamber 21, 23. The guiding pin 63, 65 is located in front of the protection wall 46, 48 of the respective rotary cap 38, 40.

Referring back to FIG. 1, the male electrical connector 10 comprises a shield 66 having a tubular shape along the mating axis XX'. The shield 66 is interleaved between the inner housing 20 and the tube 14 of the outer housing 12.

Figure 3:
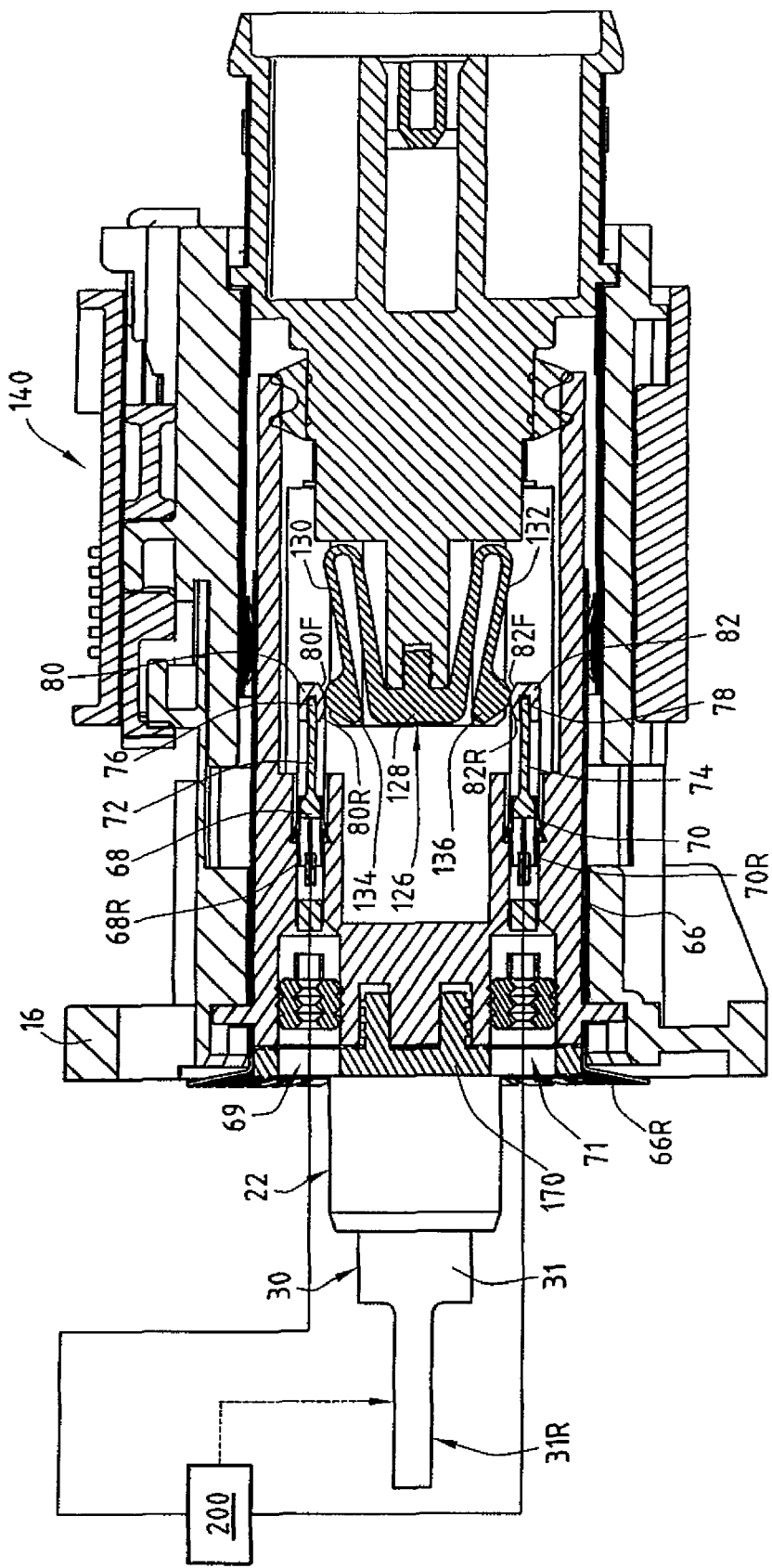
FIGS. 3 and 4 are cross section views of the male and female connectors in a pre mated position.

Referring to FIGS. 3 and 4, the shield 66 comprises a rear flange 66R that extends perpendicularly to the mating axis XX', rearward from the base flange 16. The rear flange 66R is intended to ensure shielding continuity with the element on which the male connector 10 is mounted. The shield 66 is made of two identical half-round shield elements.

Referring to FIG. 3, the male connector 10 comprises two longitudinal interlock contacts 68, 70, located between the accommodating chambers 21, 23. Each interlock contact 68, 70 comprises a front plate 72, 74 extending parallel to the mating axis XX', and a respective rear end 68R, 70R intended to be connected to a respective control wire intended to be connected to an electrically controllable power switch 200. Each front plate 72, 74 comprises a front end 76, 78.

Each rear end 68R, 70R faces a respective rear hole 69, 71 provided through the base flange 16 for letting the control wires pass.

The male power contacts 30, 32 are intended to be connected to the electrical power source trough the power switch 200. The connection of the interlocking contacts is intended to close the power switch 200, and the disconnection of the interlocking contacts is intended to open the power switch 200.

The interlocking contacts and the power switch provide, as it is explained below a first on / last off switch system. Indeed, the interlocking contacts circuit is closed first so as to power up the power circuit comprising the male power contacts 30, 32, only when the male and female connectors are sufficiently plugged together. Reciprocally, the interlocking contacts circuit is open last so as to power down the power circuit first and before the male and female connectors are completely unplugged.

To this aim, the male connector 10 comprises two insulating lugs 80, 82. Each lug 80, 82 is located along a respective one of the front ends 76, 78 of the front plates 72, 74. Each lug 80, 82 comprises a front ramp 80F, 82F and a rear ramp 80R, 82R. These lugs provide for safety means as it will be explained below.

The male connector 10 further comprises a stopping pin 84 projecting outwardly from the tube 14 of the outer housing 12.

Referring to FIG. 2, the female connector 100 comprises an outer body 102 comprising a tube 104 with an advantageously oval transversal cross section. The tube 104 extends along the mating axis XX'. The outer body 102 comprises a lateral wall 106 extending parallel to the mating axis XX', next to the tube 104.

The outer body 102 comprises two cylindrical sleeves 110, 112, each extending along a respective one of the axis YY', ZZ', and each delimitating a respective accommodating chamber 109, 111.

Figure 12:
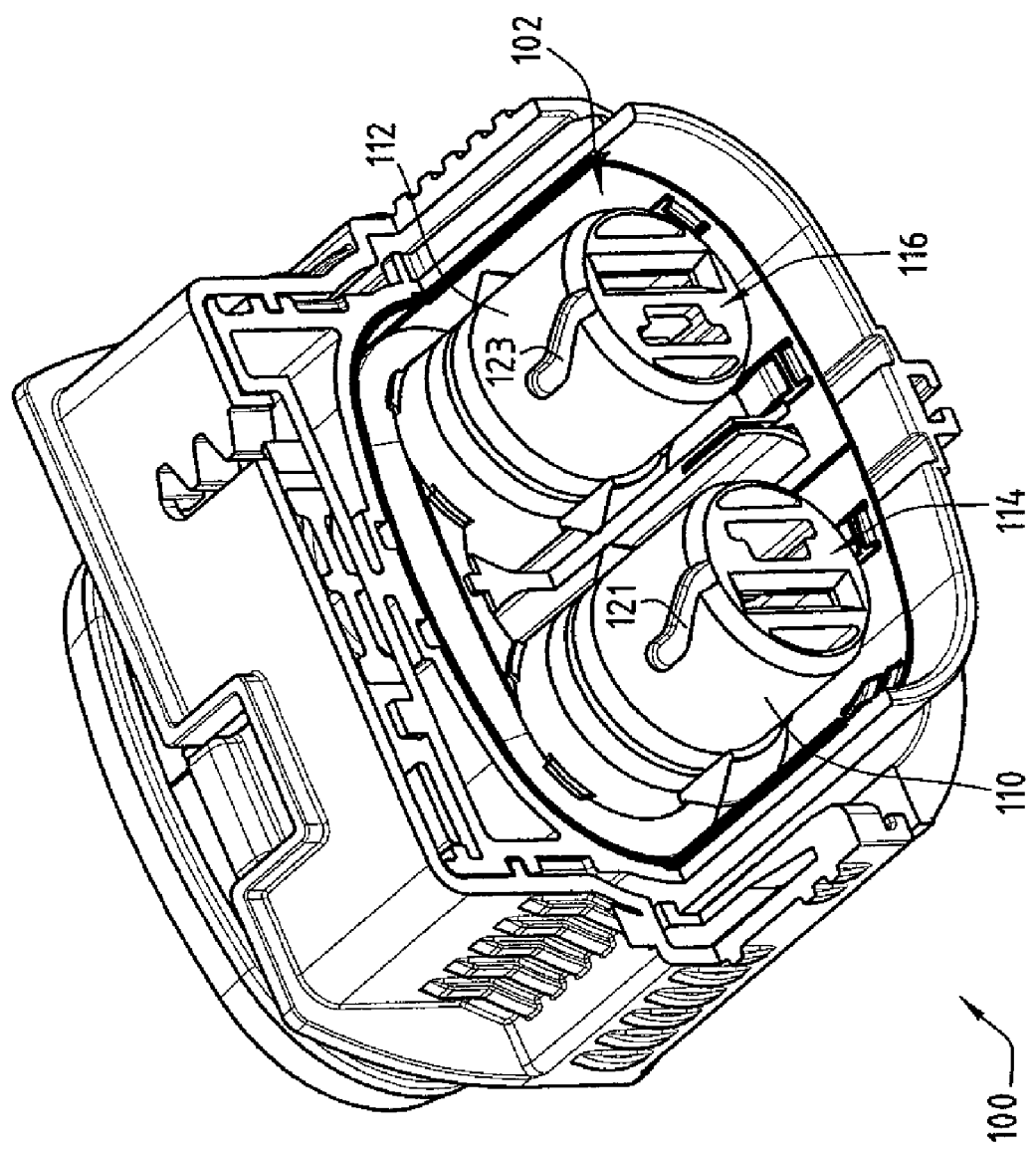
FIG. 12 is a three dimensional view of an outer body of the female connector.

Referring to FIG. 12, each sleeve 110, 112 of the female connector 100 comprises a respective guiding groove 121, 123, intended to engage a respective one of the guiding pins 63, 65 of the rotary caps 38, 40. The guiding grooves 121, 123 are at an angle with respect to the mating axis XX', so that the sliding of the guiding pins 63, 65 in the grooves 121, 123, makes the rotary caps 38, 40 rotate around the respective axis YY', ZZ' and move rearward with respect to the male connector 10.

Figure 11:
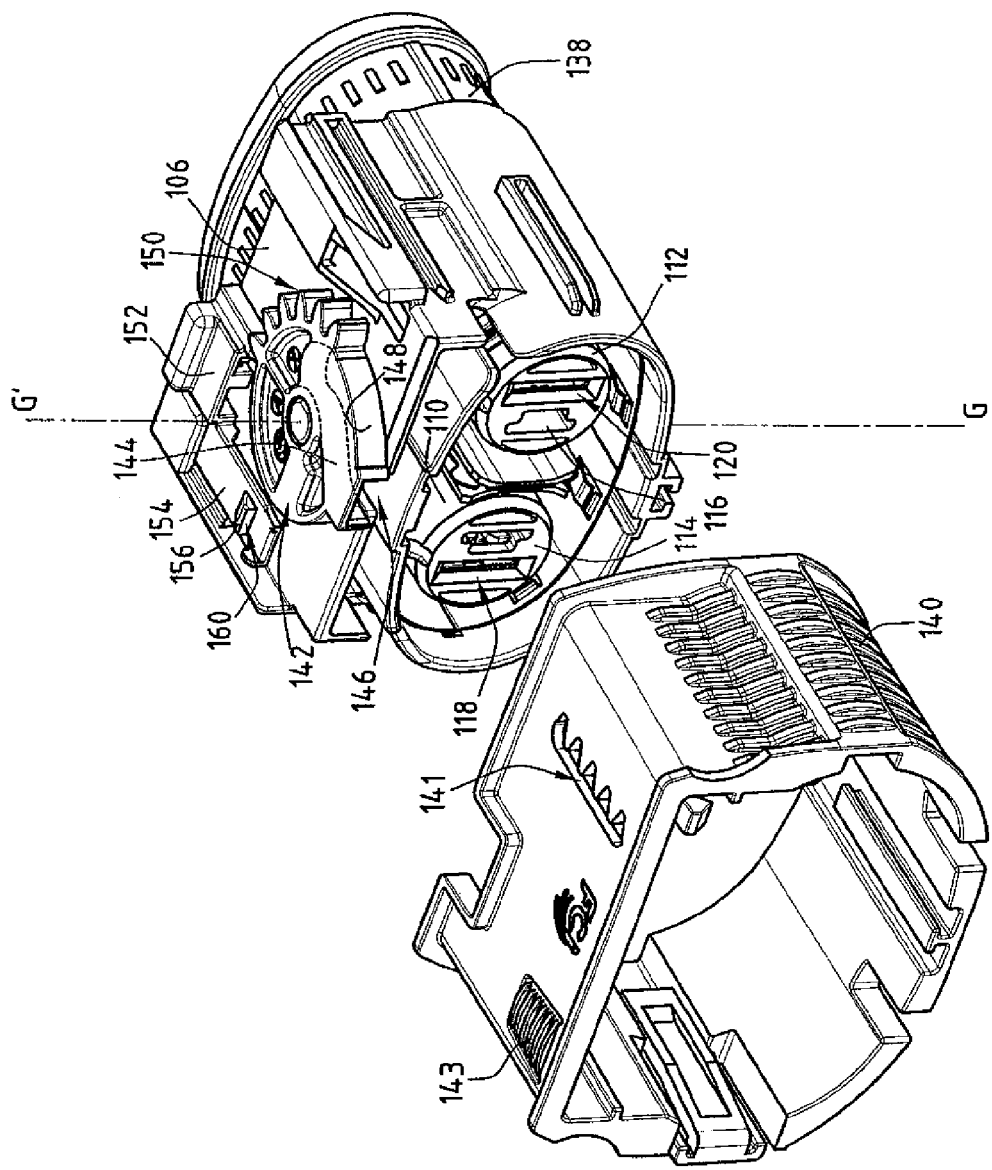
FIG. 11 is an exploded three dimensional view of the female connector.

Referring to FIG. 11, each sleeve 110, 112 of the female connector 100 comprises a front face 114, 116 provided with a rectangular front aperture 118, 120 intended to receive a respective one of the male power contacts 26, 28 during mating.

Referring to FIG. 4, the female connector 100 comprises a female power contact 122, 124 accommodated in a respective one of the accommodating chambers 109, 111, behind the front face 114, 116.

Referring to FIG. 3, the female connector 100 comprises an interlock shorting member 126. The interlock shorting member 126 comprises a central portion 128 and two opposite arms 130, 132, curved around an axis perpendicular to the mating axis XX' in a hairpin fashion, so as to be able to resiliently deform transversally with respect to the mating axis XX'. Each arm 130, 132 comprises a free end 134, 136, on both sides of the central portion 128. The interlock shorting bar 126 is located between the two sleeves 110, 112, so that, when the male and female connectors 10, 110 are in the process of being mated, each free end 134, 136 is located in front of a respective one of the interlock contacts 68, 70, and more precisely in front of a respective one of the lugs 80, 82.

Referring back to FIG. 2, the female connector 100 comprises a shield 138 having a tubular shape around the mating axis XX'. The shield 138 is interleaved between the sleeves 110, 112 and the tube 104 of the outer body 102. The shield 138 is intended to contact the shield 66 when the male and female connectors 10, 100 are mated, in order to ensure shielding continuity between the male and female electrical connectors 10, 100. The shield 138 is made of two identical half-round shield elements.

Referring to FIG. 11, the female connector 100 comprises a slider 140 having a tubular shape along the mating axis XX'. The slider 140 is slidingly mounted on the outer body 102 and comprises a longitudinal rack 141 extending parallel to the mating axis XX'. The slider 140 comprises a button 143, advantageously hinged relatively to the slider body and adapted to be pushed along a direction perpendicular to the mating axis XX'.

Figure 13:
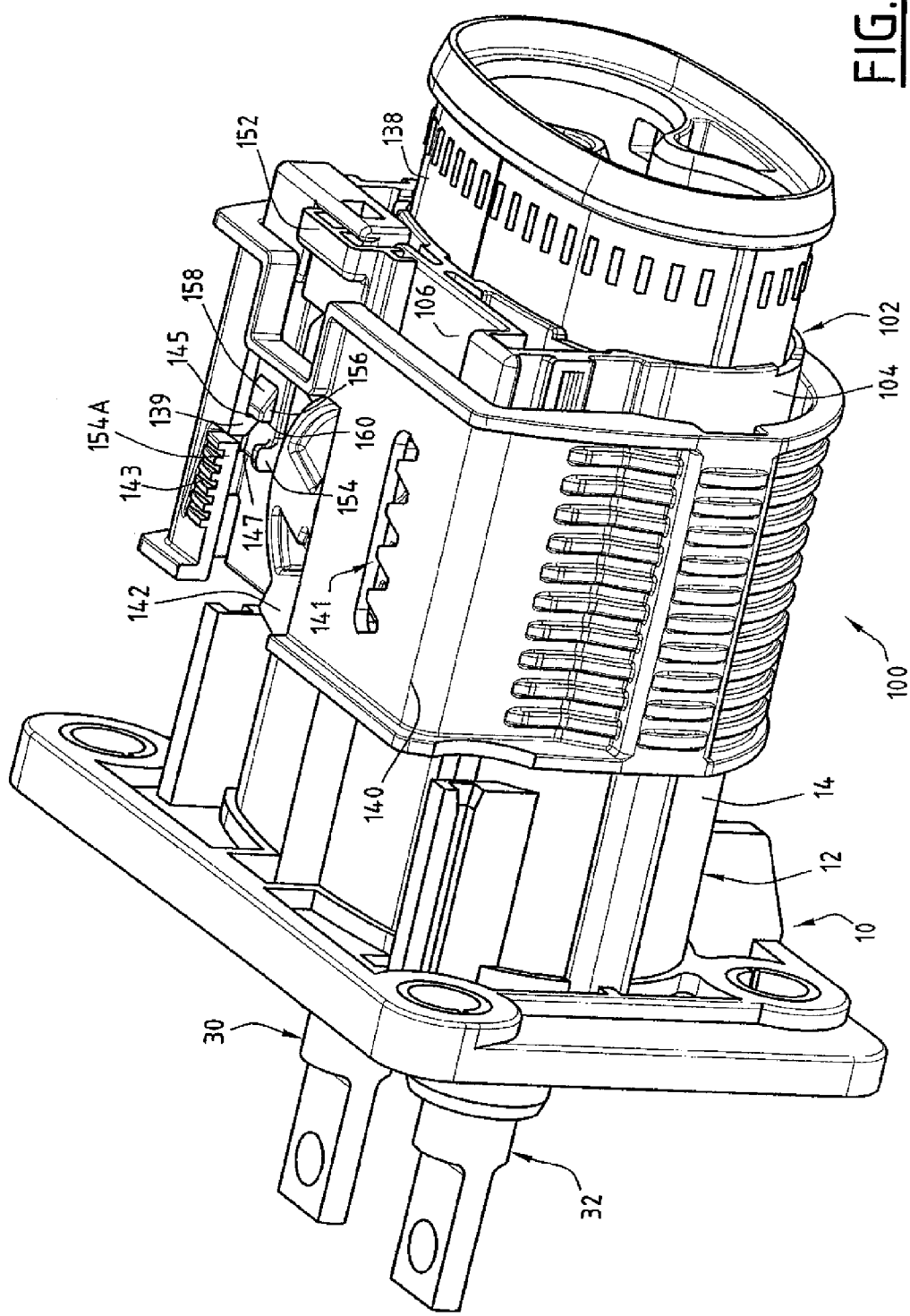
FIG. 13 is a three dimensional view of a slider and an outer body of the female connector.

Referring to FIG. 13, the slider 140 comprises a stopping tooth 139 projecting toward the lateral wall 106. The stopping tooth 139 comprises a front transversal wall 145 and a rear ramp 147.

Referring to FIG. 11, the female electrical connector 100 comprises a cam gear 142 mounted on the lateral wall 106. Such a mechanism is described in the US patent publication U.S. Pat. No. 7,241,155 B2. The cam gear 142 is able to rotate with respect to the lateral wall 106 around an axis GG' perpendicular to the mating axis XX'. The cam gear 142 comprises a corridor 144 for receiving and driving the stopping pin 84. The corridor 144 is advantageously circular around an axis parallel to and offset from the GG' axis. The corridor 144 comprises an entrance aperture 146 for the entrance of the stopping pin 84, and a stopping side wall 148, delimitating the outer periphery of the corridor 144, and intended to cooperate with the stopping pin 84.

The cam gear 142 comprises a circular rack 150, extending circularly around the GG' axis. The circular rack 150 is intended to cooperate with the longitudinal rack 141 of the slider 140.

Figure 16:
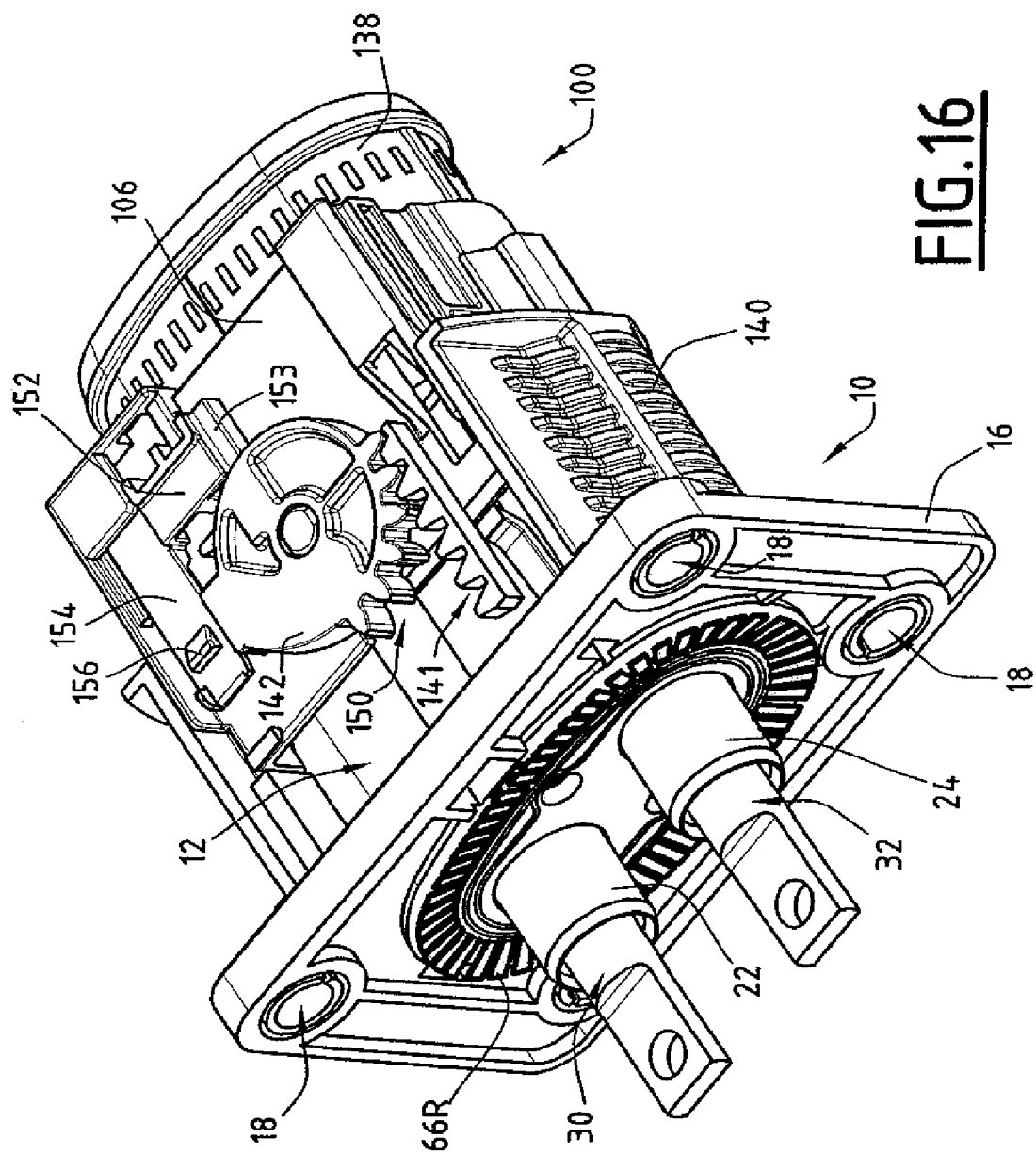

The female connector 100 comprises a blocking element 152 for blocking the male and female connector 10, 100 when they are mated. The blocking element 152 is mounted on the lateral wall 106, and intended to slide parallel to the mating axis XX' with respect to the lateral wall 106, in order to take a frontward blocking position (FIG. 16), in which a blocking arm 153 of the blocking element 152 blocks the rotation of the cam gear 142, by entering into a blocking aperture (not visible) provided in the cam gear 142.

The blocking element 152 further comprises a flexible longitudinal arm 154 with a stopping tooth 156, intended to cooperate with the stopping tooth 139 of the slider 140. As shown on FIG. 13, the stopping tooth 156 comprises a rear ramp 158 for cooperating with the front ramp 147 in order to let the slider 140 slide frontward, and a front wall 160 for stopping a rearward translation of the slider 140, by engagement with the rear wall 145 of the stopping tooth 139.

For safety reasons, each one of the two accommodating chambers of the male connector 10, and of the female connector 100, is sealed independently of the other one.

In this way, if water enters one accommodating chamber, it is still not able to enter the other one, thus preventing a short circuit between the two power contacts.

More precisely, referring to FIGS. 3 and 4, the male connector 10 comprises a rear flat seal 170 applied against the base flange 16 and surrounding the cylindrical sleeves 22, 24 and the rear holes 69, 71. The rear flat seal 170 extends inside the rear flange 66R of the shield 66. The rear flat seal 170 further comprises a plug 172 (FIG. 4) for sealing longitudinal channels 174 used in the manufacturing process.

Furthermore, the male connector 10 comprises a respective O-ring 176, 178 for each male power contact, to ensure sealing between the male power contact 30, 32 and the respective sleeve 22, 24. Each O-ring 176, 178 is mounted in a respective annular groove 180, 182 provided in the respective male power contact 30, 32.

Referring to FIG. 4, the female connector 100 comprises a respective rear lip seal 184, 186 located at the rear of each one of the respective circular sleeves 110, 112. Each rear lip seal 184, 186 is intended to ensure sealing with a respective power cable (not shown) connected to the respective female power contact 122, 124.

The female connector 100 further comprises a respective front circular interfacial seal 188, 190 mounted on each circular sleeve 110, 112 and intended to ensure sealing with the inner housing 20.

The female connector 100 further comprises a global interfacial seal 192, surrounding the two power contacts and the interlock contacts, and intended to ensure sealing with the inner housing 20 of the male connector.

The mating of the male and female electrical connectors 10, 100 will now be explained.

Three plugging movement portions and three positions are defined for describing how the male and female connectors are mated/unmated, or in other words plugged/unplugged or electrically connected/unconnected. A first plugging movement portion corresponds to a configuration in which the male and female connectors are considered unmated or unmated. This first plugging movement portion starts for instance when the male and female connectors are aligned but not at all engaged with each other. This first plugging movement portion ends just at a pre-mated position A, which corresponds to a position just before the arms 130, 132 engage the front ramp 80F, 82F of the respective lug 80, 82. Position A defines the starting point the second plugging movement portion. The second plugging movement portion ends at the intermediate position B, once the free ends 134, 136 come into electrical contact with the front plates 72, 74. The end of the second plugging movement portion corresponds to the beginning of the third plugging movement portion. The mated position C, once the power male 30, 32 and female 122, 124 contacts are in electrical contact with the front plates 72, 74, defines the end of the third plugging movement portion.

The male and female connectors 10, 100 are first set in a pre-mated position A, in which they are aligned with respect to the mating axis XX'.

Figure 14:
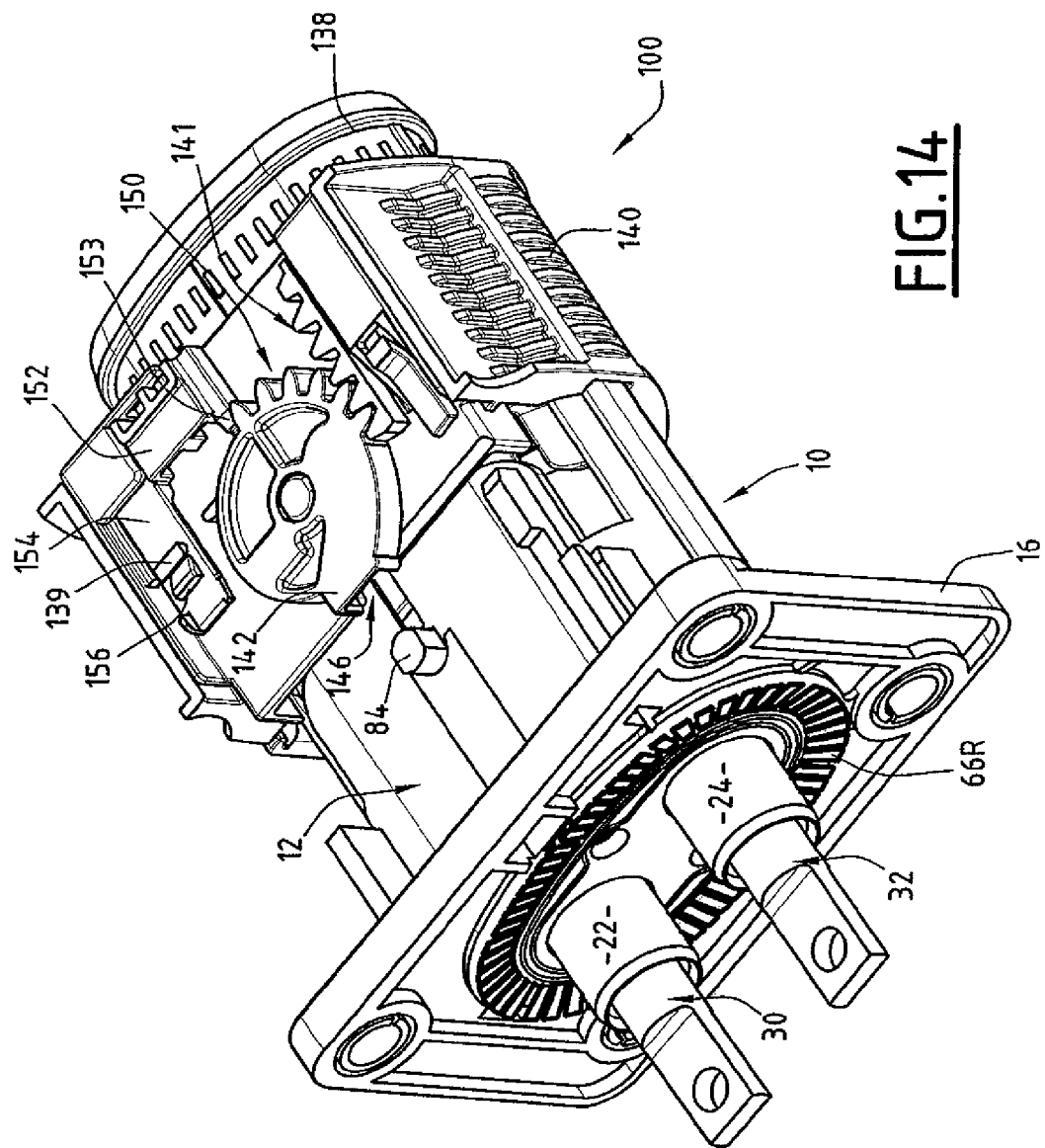
FIGS. 14 to 16 are three dimensional views of the female connector, without the slider, during mating/unmating.

Referring to FIG. 14, in the pre-mated position A, the slider 140 is in a rear position, with the longitudinal rack 141 engaged with the circular rack 150. The entrance aperture 146 heads frontward and is located in front of the stopping pin 84.

Figure 7:
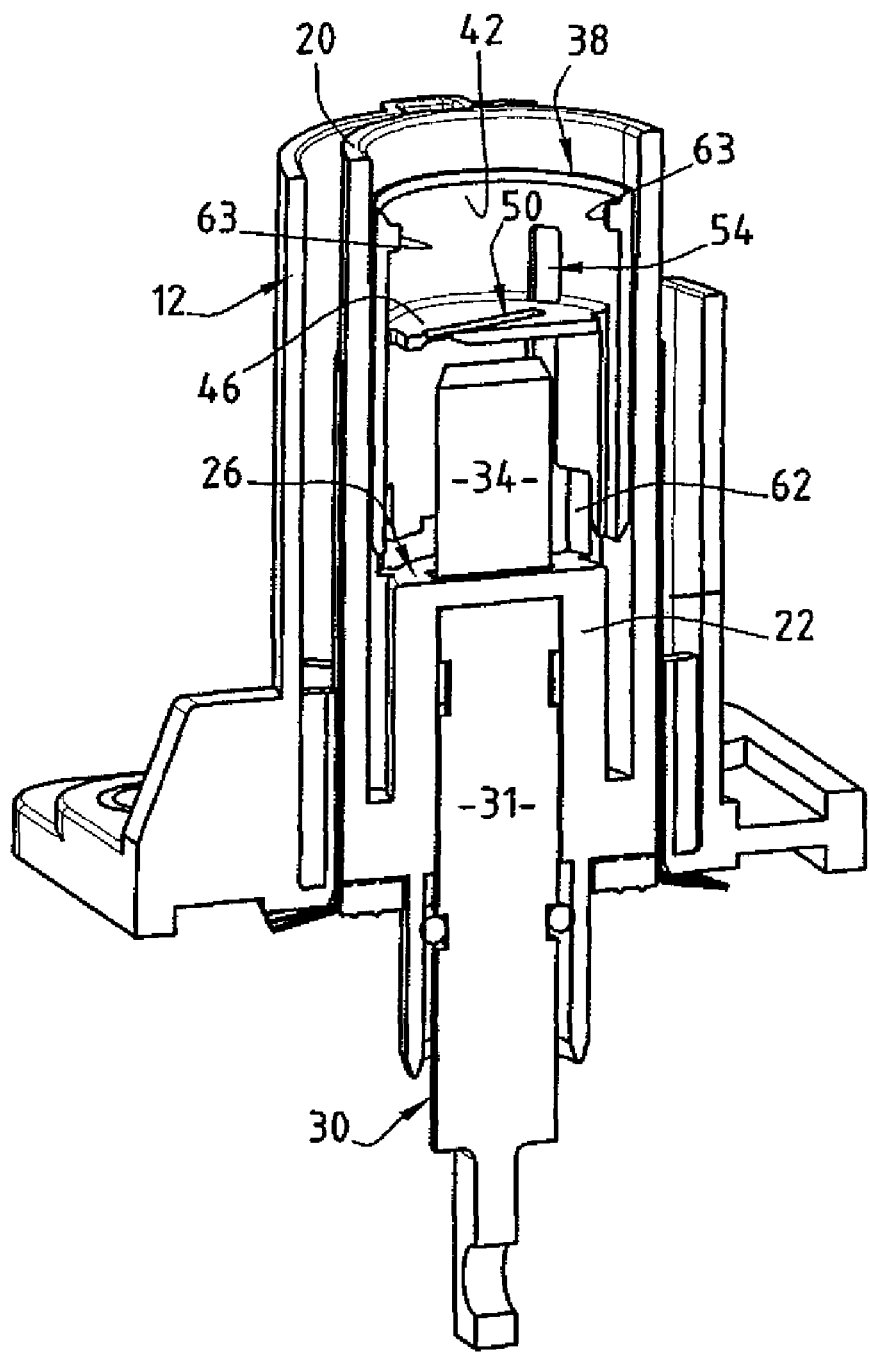
FIG. 7 is a cross section view of a male power contact and of a rotary cap.

Referring to FIG. 7, in the pre-mated position A, the rotary caps 38, 40 are in a protection position, so that the protection walls 46, 48 are each located in front of the respective plane lance 34, 36, with the apertures 50, 52 rotated around the respective axis YY', ZZ' with respect to the plane lance 34, 36, so that they are misaligned with the plane lances 34, 36. In the protection position, the protection walls 46, 48 prevent contact with the male power contacts 30, 32 in particular with fingers of a hand.

Figure 8:
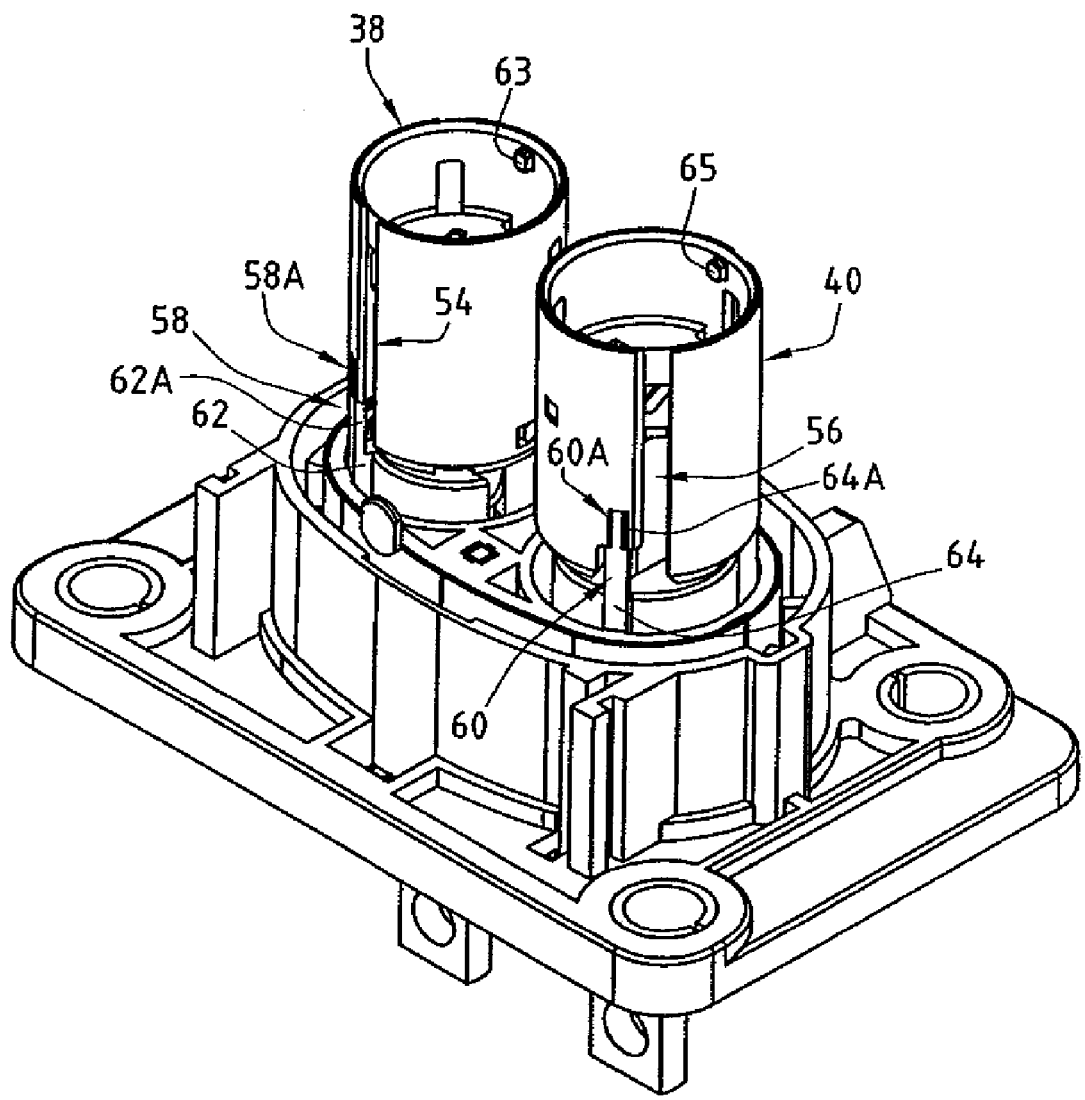
FIGS. 8 to 10 are three dimensional views of the male power contacts and of the rotary caps, during operation of the rotary caps.
Figure 9:
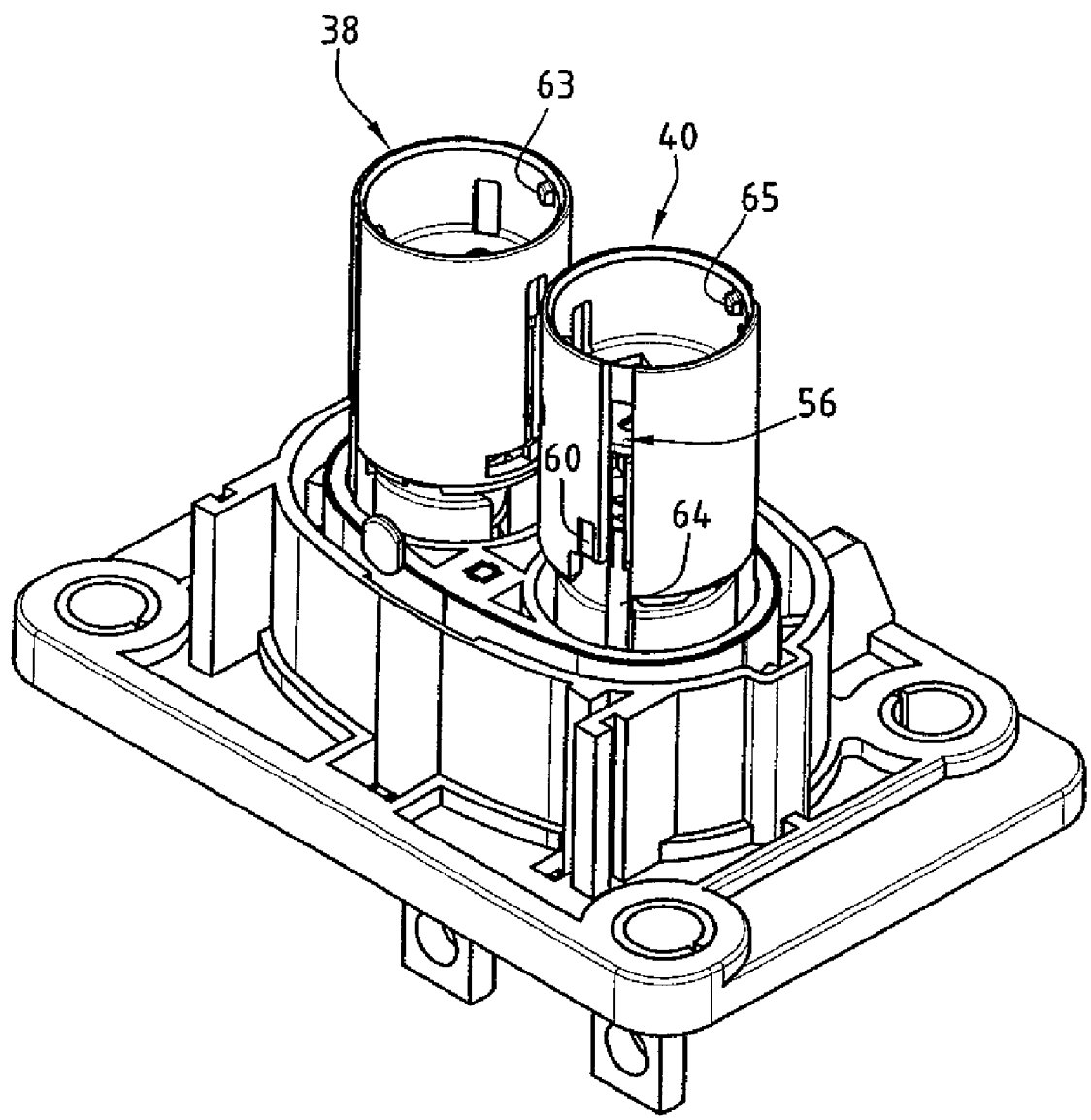
Figure 10:
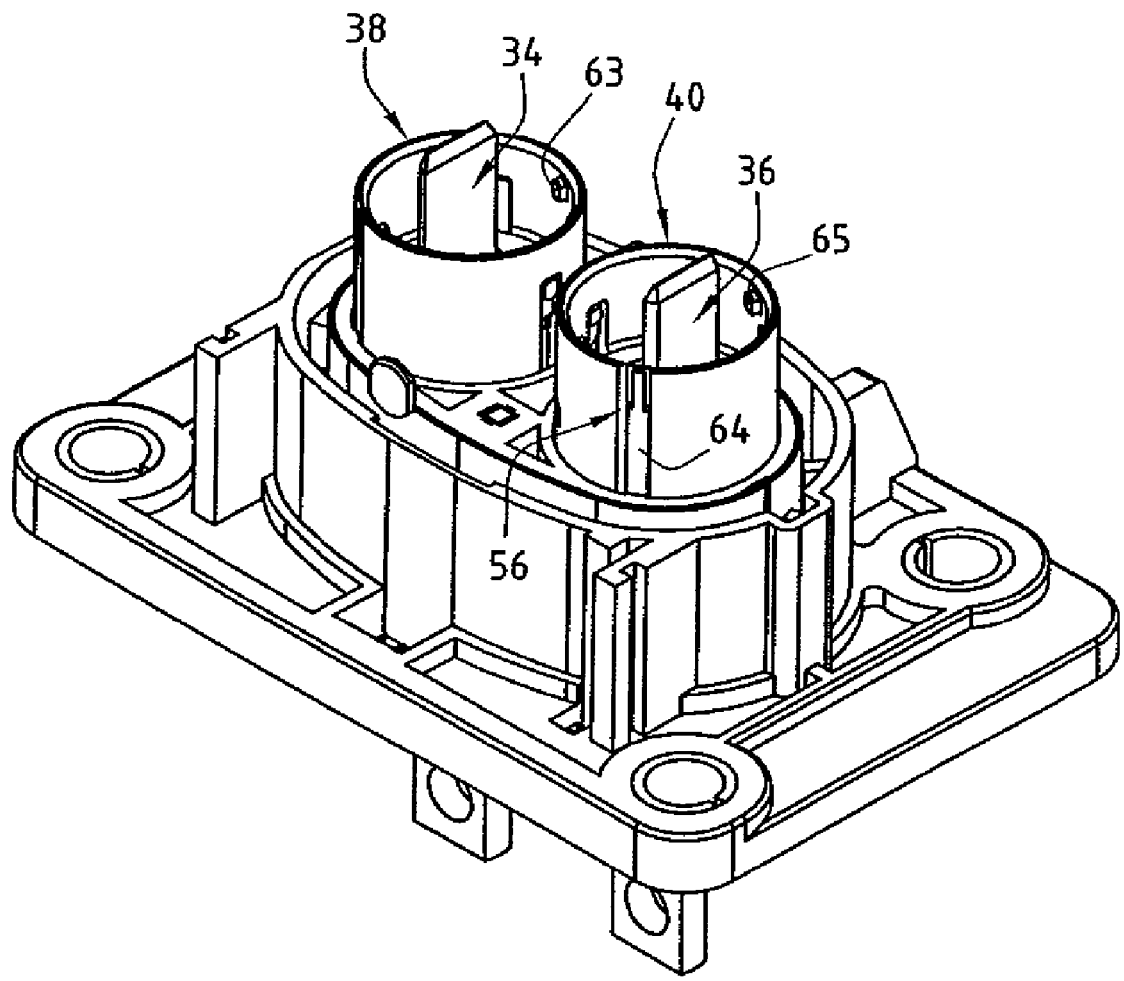

Referring to FIG. 8, the rotary caps 38, 40 are kept in the protection position by pegs 62, 64 above the contacts 30, 32. For each rotary cap, three pegs are engaged in three respective rear troughs 58, 60. More precisely, the fingers 62A, 64A are engaged in the respective rear trough 58, 60 so as to prevent the protection wall 46, 48 to attain a use position that will be detailed below.

The male and female electrical connectors 10, 100 are then displaced along the mating axis XX' towards each other. During this displacement, the sleeves 110, 112 of the female connector 100 are introduced into the rotary caps 38, 40. The guiding pins 63, 65 of the rotary caps 38, 40 engage the grooves 121, 123. Since the grooves 121, 123 are bent, the longitudinal sliding of the sleeves 110, 112 into the guiding walls 42, 44 is no longer possible, without pushing the male and female toward each other so as to overcome the elastic force that maintains the fingers 62A, 64A in their respective notches 58A, 60A. While the guiding pins 63, 65 are driven in the portion of grooves 121, 123 which is not parallel to the axis YY' or ZZ', the rotary caps are forced to rotate around the respective axis YY', ZZ'. Once the fingers 62A, 64A are disengaged from the notches 58A, 60A, the pegs 62, 64 align the grooves 54, 56. It is preferred to have the translation of the rotary caps guided by the pegs in the grooves, rather than by the apertures 50, 52 on the plane lances 34, 36. Indeed, it is preferable to have a friction of plastic on plastic rather than a friction of plastic on metal. Further, the chain of dimensions is better controlled when the materials are the same.

In this position, the apertures 50, 52 of the rotary caps 38, 40 are aligned with their respective plane lances 34, 36. Once, the guiding pins 63, 65 reach the dead end of the grooves 121, 123, the rotary caps are pushed backward, so that the protection walls 46, 48 attain a use position in which the respective plane lance 34, 36 passes through the respective protection wall 46, 48, through the respective aperture 50, 52.

During the same movement of the female and male connectors toward each other, the stopping pin 84 enters the corridor 144 by the entrance aperture 146. The slider 140 is then moved frontward, which leads to the rotation of the gear cam 142 around the axis GG', through the cooperation of the racks 150, 141. The corridor 114 then moves the stopping pin 84 frontward in order to further bring the male and female connectors 10, 100 towards each other until reaching the last unmated A. The use of the racks 150, 141 makes that a large displacement of the slider 140 leads to a small displacement of the stopping pin 84 that is moved by the corridor 144, so that the force needed to bring the male and female connector towards each other is lowered, and in particular the effort for connecting the male and female power contacts is lowered. In the last pre-mated position A, the male power contacts 30, 32 respectively contact the female power contacts 122, 124, while the free ends 134, 136 of the interlock shorting member 126 are in front of the lugs 80, 82.

The male and female connectors 10, 100 are brought towards each other by sliding the slider 140 on the first plugging movement portion, so that the interlock shorting member 126 comes into contact with the lugs 80, 82.

In the first plugging movement portion, the heads of the arms 130, 132 engage the front ramp 80F, 82F of the respective lug 80, 82, for moving the arm 130, 132 away from the respective interlock contact 68, 70.

The male and female connectors 10, 100 are then further brought towards each other by sliding the slider 140, until the free ends 134, 136 are guided by the rear ramps 80R, 82R in order to come into the intermediate position B, in which the arms 130, 132 contact the front plates 72, 74 of the interlock contacts 68, 70, therefore electrically connecting the interlock contacts 68, 70 together. The switch 200 is then powered up and closes the power circuit comprising the power contacts 30, 32.

During the displacement from the pre-mated position A to the intermediate position B, each arm 130, 132 thus interacts with the associated lug 80, 82 so that the arm 130, 132 resiliently deforms while going round the lug 80, 82. The lugs 80, 82 provide for safety means and allow to be sure that the intermediate position, in which the resilient arms 130, 132 come into contact with the interlock contacts, is independent from the exact location of the interlock contact in the first connector, and the errors or tolerances in the form of the interlock contact, in particular with its length.

The interlock shorting member 126, its arms 130, 132 and the lugs 80, 82 thus form connecting means for connecting the two interlock contacts 68, 70 with each other, while the lugs 80, 82 form separating means for moving the arms 130, 132 away from their respective interlock contact 68, 70 between the pre-mated position A and the intermediate position C.

The distance, corresponding to the first plugging movement portion, between the pre-mated position A and the intermediate position B is determined, during design of the connector assembly, according to manufacturing clearances and to a desired penetration distance of the male power contacts into the female power contacts at the intermediate position B, so that an appropriate mating and connection of the power contacts 30, 32 is ensured before the power contacts are powered up by the power source.

The slider 140 is moved frontward, so that the male and female connectors 10, 100 are brought nearer to each other, through the second plugging movement portion, until a mated position C (FIG. 15) is reached.

Between the intermediate position B and the mated position C, each arm 130, 132 is resiliently deformed, so that each free end 134, 136 slides and leans on the front lance 72, 74 of the respective interlock contact 68, 70.

It should be noted that the male and female power contacts 30, 32, 122, 124 are configured for maintaining the contact with each other all the way of the second plugging movement portion between the intermediate B and mated C positions.

The blocking element 152 is then pushed frontward until its blocking position (FIG. 16), in which the arm 153 engages the gear cam 142 for preventing its rotation.

The operations of unmating the male and female connectors 10, 100 will now be described.

Figure 15:
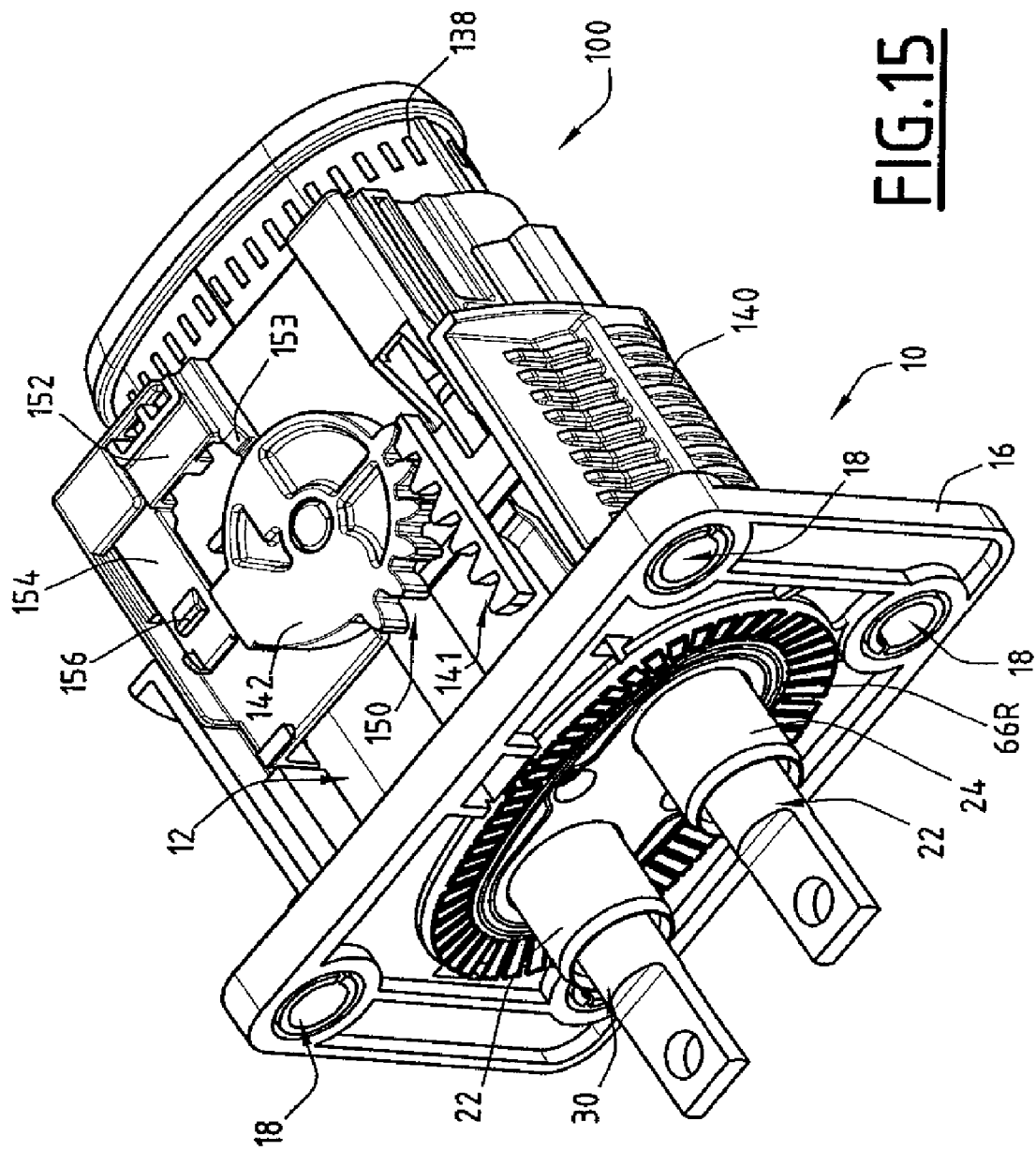

The blocking element 152 is pushed rearward, so that it does not block the gear cam 142 (FIG. 15).

The slider 140 is slided rearward, which leads to the rotation of the gear cam 142, until a blocked position (FIG. 13) in which the stopping teeth 139, 156 engages with each other to block a further sliding of the slider 140 away from the male electrical connector 10.

In the blocked position, the stopping pin 84 is still in the corridor 144, so that the stopping pin 84 is stopped by the stopping side wall 148 of the corridor 144 (FIG. 11), locking the male and female connectors 10, 100 in this position.

Preferably, the blocked position occurs between the intermediate position B and the last (for first during the unmating) pre-mated position A, i.e. along the first plugging movement portion, when the power contacts are connected to each other, while the interlock contacts are disconnected from each other.

The button 143 is then pushed along an axis perpendicular to the mating axis XX'. The button 143 pushes in turn the flexible arm 154 in order to shift, perpendicularly to the mating axis XX', the stopping tooth 156 with respect to the stopping tooth 139 (FIG. 13).

The slider 140 is then moved further away from the male connector 10, in order to align the entrance aperture 146 with the stopping pin 84. The slider 140, the gear cam 142 and the two racks 141, 151 thus form shifting means for shifting the stop formed by the stopping side wall 148 with respect to the stop formed by the stopping pin 84.

It should also be noted that the stopping tooth 139 and the blocking element 152 with its stopping tooth 156 form blocking means for blocking the shifting means in the blocked position, while the male and female connectors 10, 100 move from the intermediate position B to the pre-mated position A. The button 143 and the flexible arm 154 on which the stopping tooth 139 is fixed, form unblocking means for deactivating the blocking means by shifting the stopping tooth 139, 156 with respect to each other.

This blocking means provide means for ensuring that the male power contact will no longer be powered while disconnected from the female power contact. This prevents that electric arc occurs during unmating of the male and female connectors. Indeed, the time period needed by the operator for pressing the button 143 for unlocking the blocking means is sufficient for the power switch 200 to open the power circuit comprising the male power contacts.

It is also to be noted that if an operator presses the button 143 from the beginning of the unmating operation, he will be stopped anyway before electrically disconnecting the male and female power contacts. Indeed, the blocking means also comprises a protrusion 154A located at the free end of the flexible arm 154 so as to block the edge of the button 143, if this button is pressed while the slider is moved from the mated position C to the intermediate position B.

The male and female connectors 10, 100 are then safely separated apart from each other along the mating axis XX'.

During this movement, the guiding pins 63, 65 of the rotary caps 38, 40 slide into the grooves 121, 123, until they reach the bent portions. Then, due to these bent portions or cams, the rotary caps are forced to rotate. While the guiding pins 63, 65 are driven in the portion of grooves 121, 123 which is not parallel to the axis YY' or ZZ', the rotary caps are forced to rotate around the respective axis YY', ZZ'. At the end of this portion, this rotation pushes the fingers 62A, 64A in the notches 58A, 60A and the rotary caps are locked in their upper position, in which it remains a gap between the protection walls 46, 48 and the lance tip of the front plane lances.

The invention is not limited to the previous embodiment. In particular, it could be transposed to a connector assembly with three male/female power contacts, intended to convey three-phase power.

The power switch circuit described above comprises an electrical loop with two male power connectors, the interlock shorting member 126 and the power switch 200, but in other embodiments of the invention, the power switch circuit may comprise at least one female power contact and/or a connector assembly comprising more than one male connector and/or female connector. For instance the power switch circuit may comprise serial power contacts of different male and/or female connectors.

Figure 17:
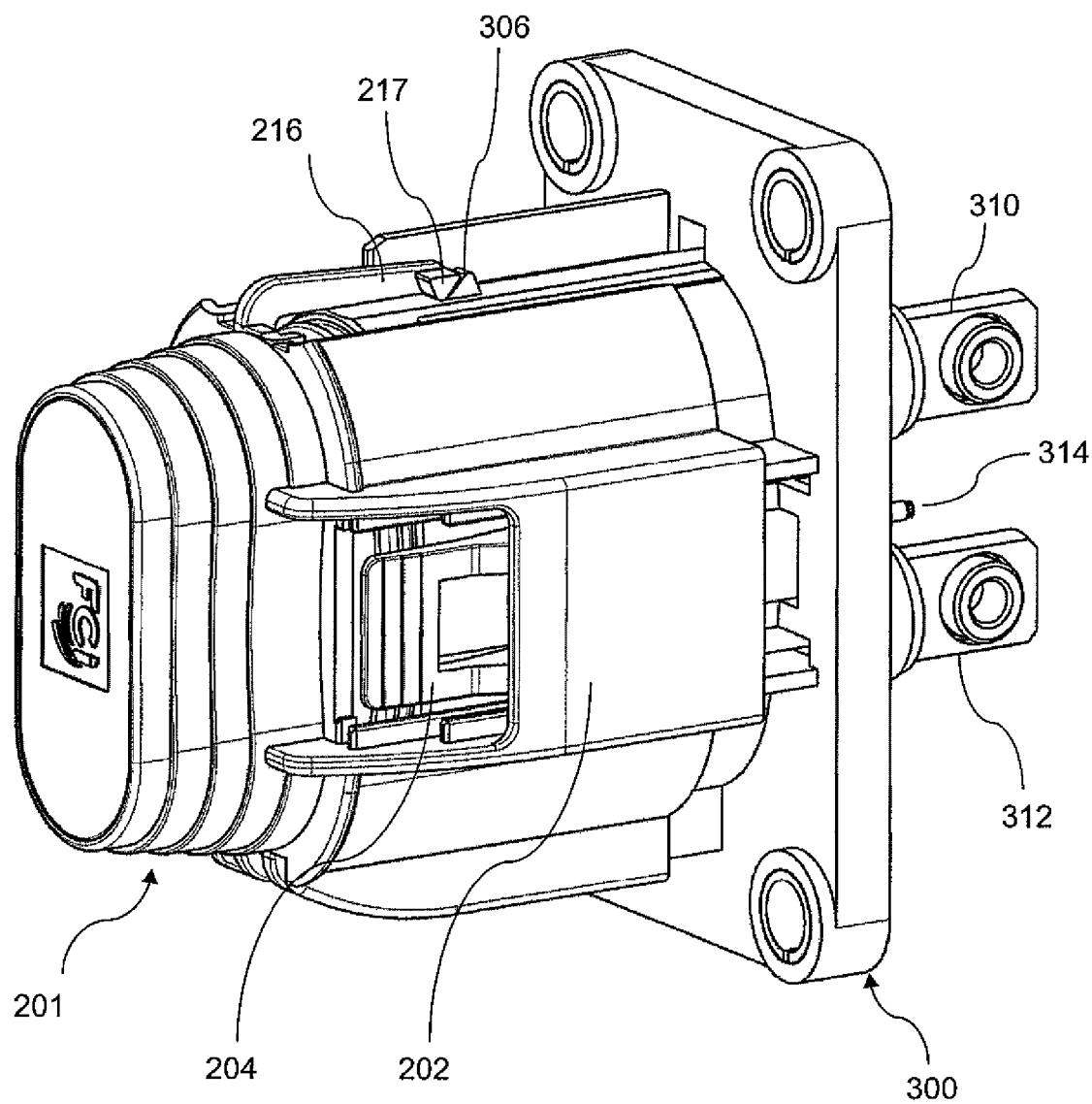
FIG. 17 shows a schematic illustration of a connector system comprising connector and counter connector according to a further embodiment of the present invention.

FIGS. 17 to 26 show an embodiment of a connector system in accordance with a further aspect of the present invention. The connector system shown schematically in FIG. 17 comprises a connector 201 in a partially mated condition with a corresponding counter connector 300. Both connector housings shown are injection molded plastic parts. As one can see from the figures, in the embodiment shown, the connector 201 is a plug-connector, more particularly a service plug as mentioned above. The counter connector 300 is in the embodiment shown provided in form of a socket, which is for example attached inside of the engine compartment of a hybrid-fuel driven passenger vehicle. The connector 201 comprises actuating means in form of an actuating arm 204, which is integrally formed with the connector housing and hinged thereto via a hood 202. The hood 202 serves at the same time as physical protection of the locking mechanism. The connector 201 is further provided with two elastic latching arms 216 provided symmetrical on two opposite sides of the connector housing, which cooperate with latching protrusions 306 provided on the counter connector. In the position shown in FIG. 17 connector and counter connector are not latched with each other. For a latching of connector and counter connector the latching nose 217 provided on the free end of the elastic latching arm 216 of the connector has to be pushed over the latching protrusion 306 in the direction of counter connector 300. The skilled person will recognize from the tapered shape of nose 217 and protrusion 306 that the lathing mechanism is a so-called "Go/No-Go" mechanism, i.e. a latching mechanism which is either fully latched (when nose 217 is behind and to the right of protrusion 306 in FIG. 17) or fully open (as shown in FIG. 17) and which does not offer any "intermediate" position, since due to the tapered shape of nose 217 and protrusion 306 the nose will in any case "slide" down on either side of protrusion 316.

The counter connector 300 further comprises electrical contact terminals 310, 312 which in practice may be connected with the power circuit of a passenger vehicle. Further, in FIG. 17 a signal wire 314 is shown, the function of which will be explained further down below in more detail.

Figure 18:
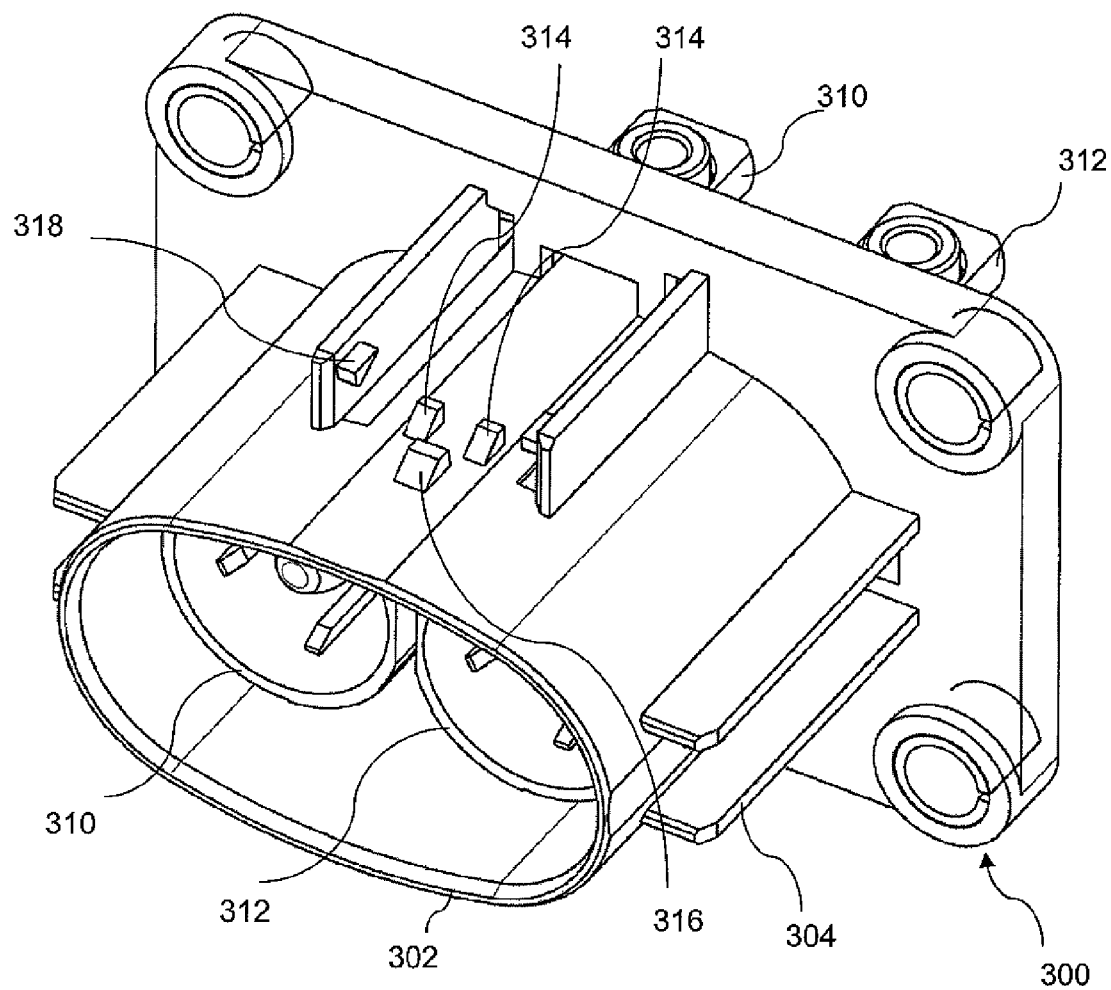
FIG. 18 shows the counter connector of the connector system of FIG. 17.

FIG. 18 is a schematic illustration of counter connector 300. The counter connector is provided with a skirt 302 which protectively surrounds the free-ends of the connect terminals 310 and 312. The skirt 302 is further provided with guide ribs 304. The counter connector 300 is provided with first locking means in form of locking noses 314 and with second locking means in the form of an additional locking nose 316. Further, a guide means 318 is provided in close proximity to the locking means. The function of locking means and guide means will be explained in the following in more details. Obviously, the number of locking and guide means is only exemplary.

Figure 19:
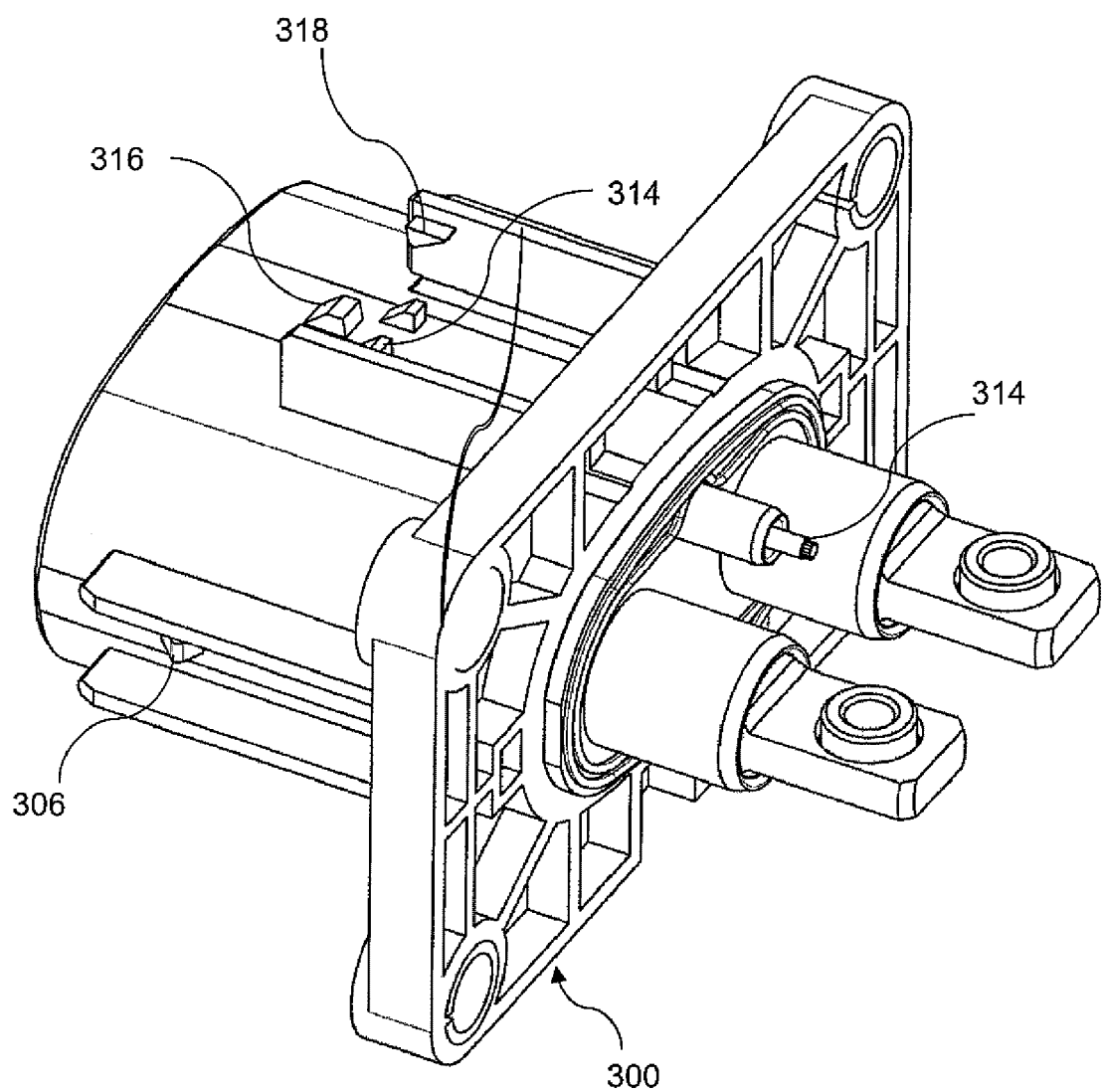
FIG. 19 shows the counter connector of FIGS. 17 and 18 from a different perspective.

FIG. 19 shows the counter connector 300 from a different perspective, namely from the rear side thereof. From this perspective the signal line 314 can clearly be seen. The signal line is in practice connected to a control device which disrupts the electrical power circuit assigned to the counter connector 300, when connector 201 is moved from the first locking position to the second locking position. On FIG. 19 one can also clearly see the arrangement of locking and guiding means on the surface of counter connector 300.

Figure 20:
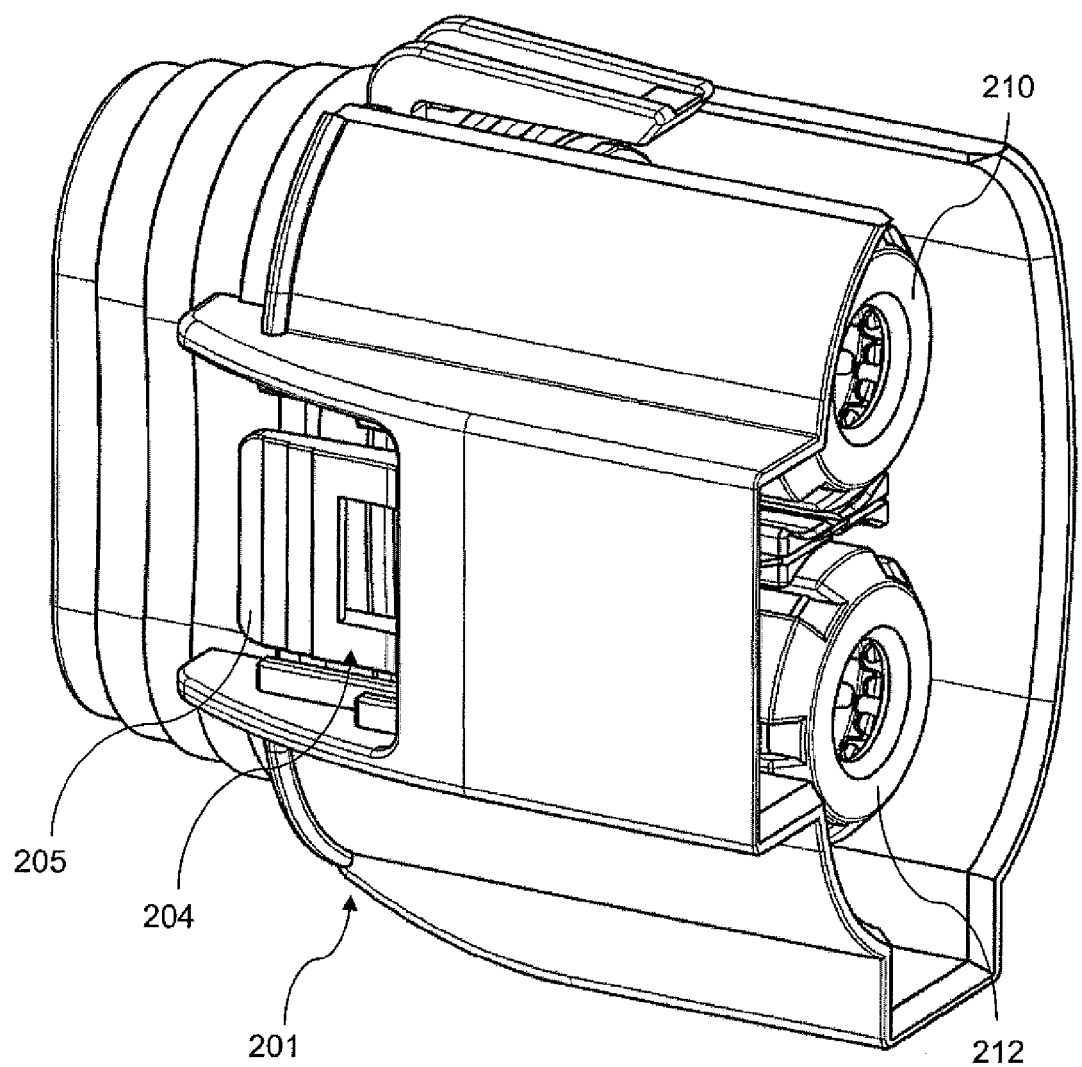
FIG. 20 shows the connector of the connector system.

FIG. 20 is a schematic illustration of connector 201. As one can see, the connector 201 comprises two electrical contact terminals 210, 212 which are arranged to cooperate with the terminals 310, 312 of the counter connector 300 when mated. The actuating arm 204 is on one end provided with a ribbed surface 205, which in use of the connector serves as actuating point for the thumb of an operator.

Figure 21:
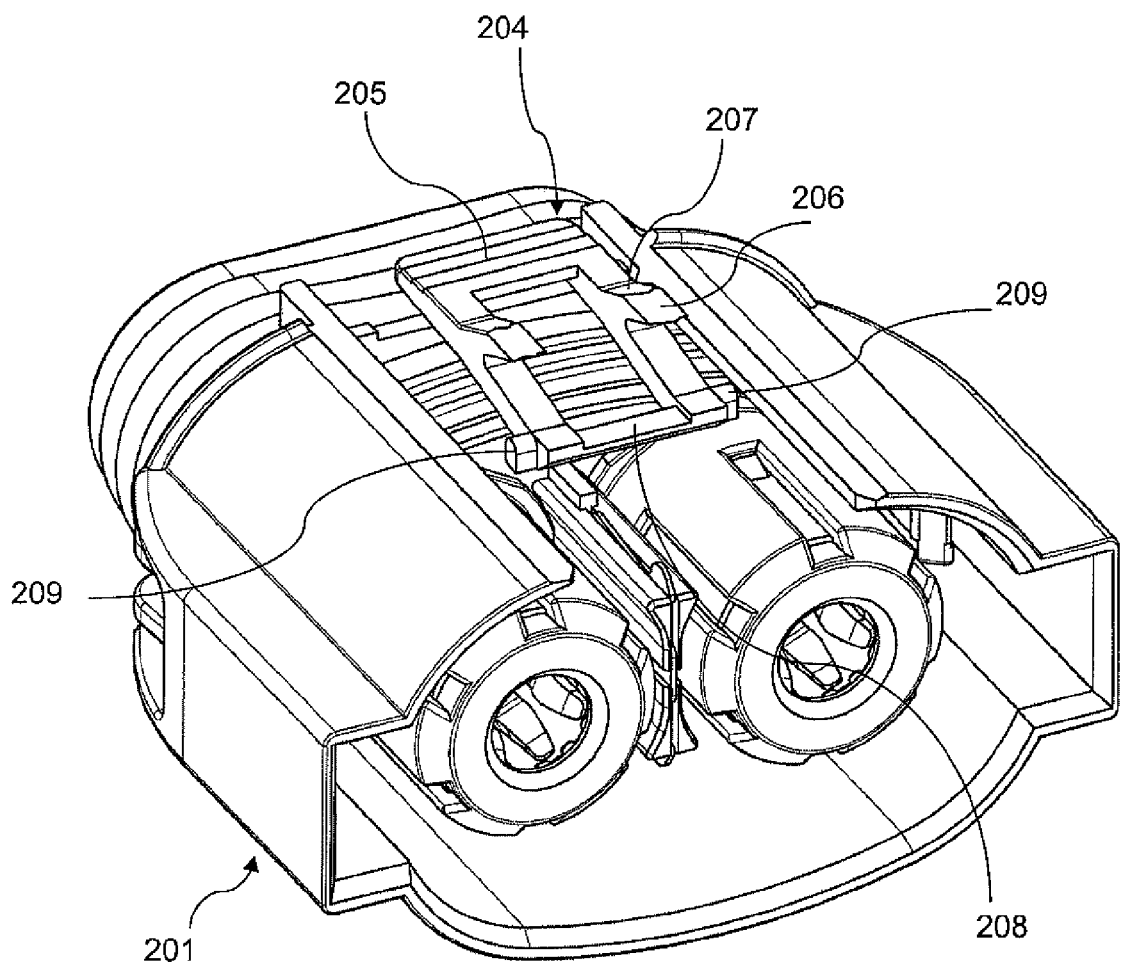
FIG. 21 is another illustration of the connector as shown in FIG. 20.
Figure 22:
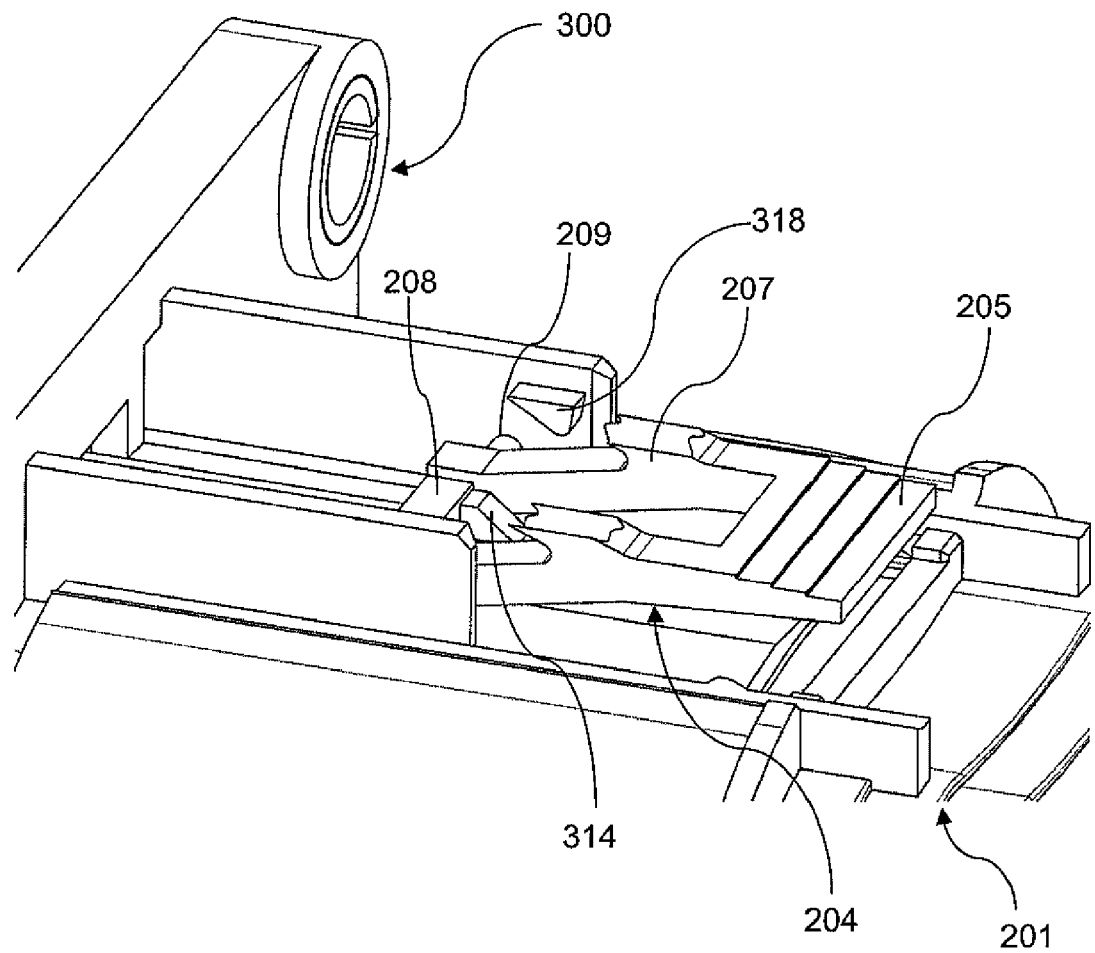
FIG. 22 is a detail of a locking mechanism in accordance with the invention.

FIG. 21 is another perspective view of connector 201 whereby the hood 202 is cut away to show the construction of the actuating arm 204. As the skilled person recognizes from the cut surfaces 206, the actuating arm 204 is hinged to the inner wall of hood 202 by means of two legs 207. The legs 207 serve as a hinge so that the actuating arm 204 can swing around the attachment point at 206 in the way of a seesaw. In other words, if an operator pushes downwardly (i.e. "downwardly" in the orientation of the efigure 21) the ribbed surface 205, the opposite end of the actuating arm will move upwardly and vice versa. The legs 207 tend to elastically bring back the actuating arm 204 in its rest position (upward). The end opposite of the ribbed surface 205 is provided with a locking surface 208 adapted to cooperate with the locking noses 314, 316 provided on the counter connector surface. Additionally, two outwardly protruding guide elements 209 are provided on the actuating arm, which are adapted to cooperate with the guide means 318 of the counter connector (see FIG. 18). The function of the actuating arm and the locking means will be explained in the following by means of the detailed views of FIGS. 22 to 26.

Figure 23:
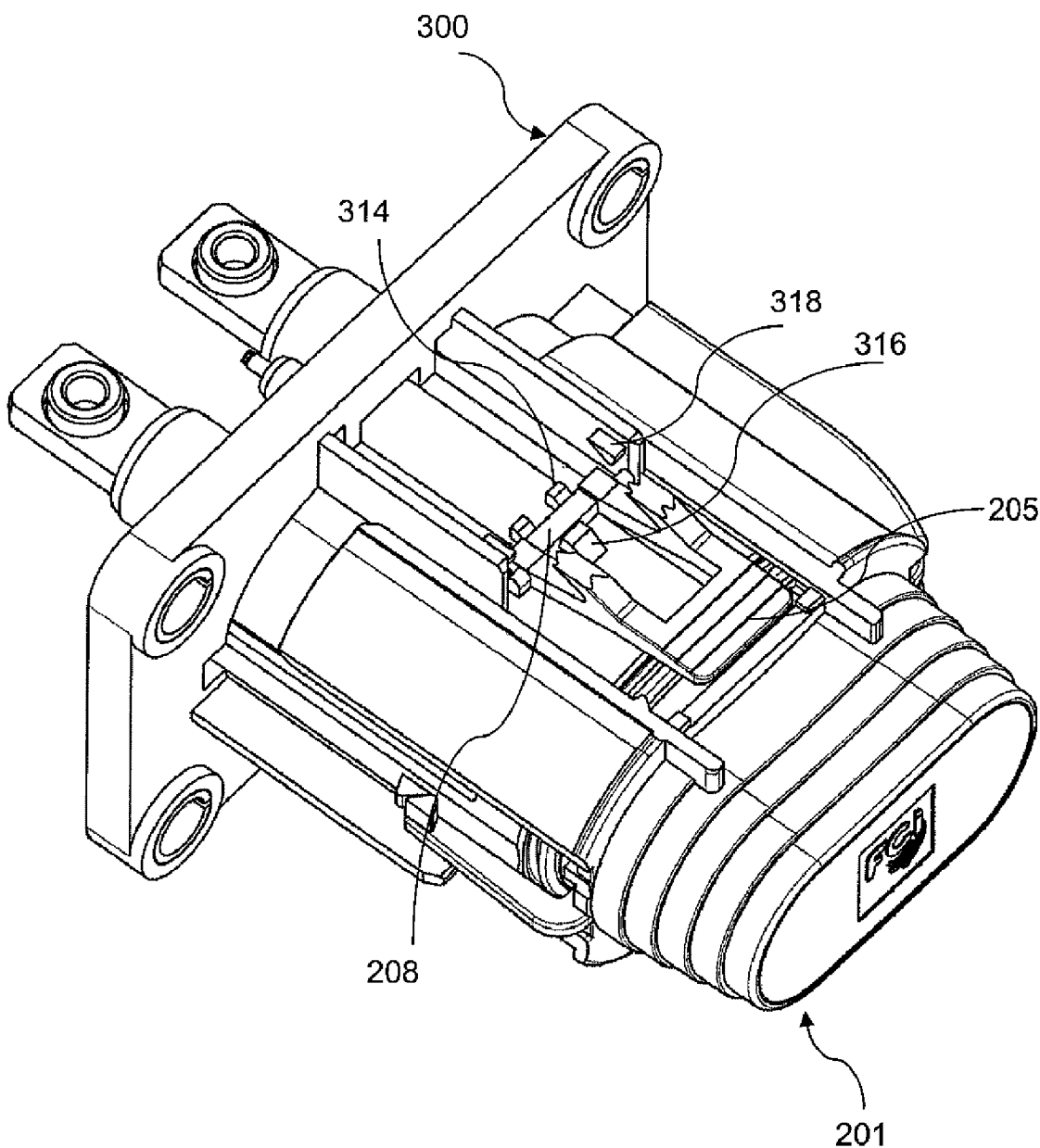
FIG. 23 is a partially cut-view of the connector system shown in FIG. 17 illustrating the locking mechanism of the invention.
Figure 24:
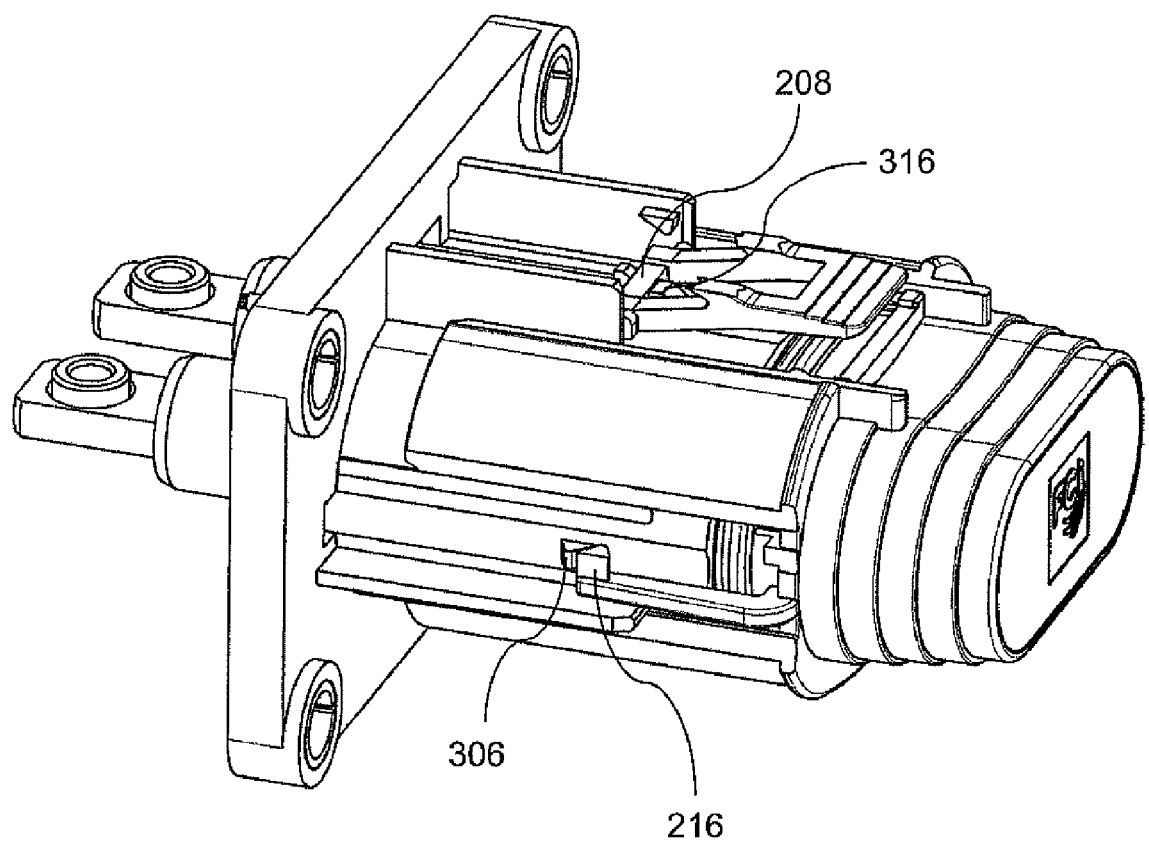
FIG. 24 shows the connector system of FIG. 23 from a different perspective.

In FIG. 22 one can again see the actuating arm 204, since the hood 202 is not shown in the illustration. When the end of the actuating arm 204 is pushed downwardly in the figures, the opposite end provided with the locking surface 208 and the guide elements 209 move upwardly. Thus, if in the position shown in FIG. 22 an operator pushes downwardly the actuating arm at the ribbed surface 205, the locking surface 208 will be lifted above the first locking noses 314 of the counter connector and the connector 201 can be moved to the right in the figure in the unmating direction away from the counter connector 300. Upon movement to the right in FIG. 22, the guide elements 209 will come into contact with the inclined surface of guide means 318. However, guide means 318 are arranged in such a relation to the locking noses 314, 316, that guide elements 209 will only come into contact with guide means 318 after the locking surface 208 is moved behind the first locking noses 314. Thus, upon further movement of the connector to the right, the guide means 318 will force the guide elements 209 downwardly in FIG. 22 whereby the locking surface 208 will automatically come into contact with the second locking nose 316. Further, the end of the actuating arm 204 with the ribbed surface 205 will automatically be pushed upwardly again, even if an operator is trying to hold this end down in the figure. The reason for that is that the forces applied by an operator upon pulling the connector out of mating engagement with the counter connector are much stronger than the forces an operator is able to apply with this thumb to actuating arm 204. Thus, due to the guide elements 209 and guide means 318 the actuating arm will lock the connector and counter connector automatically in the second locking position as depicted in FIGS. 23 and 24. At the same time, in the position shown in FIG. 23 the actuating arm 204 is again in its initial position and the guide elements 209 are sufficiently remote from the guide means 318 so that the end 205 can be pressed downwardly again, to overcome also the second locking position by releasing locking surface 208 from the second locking nose 316.

FIG. 24 shows the same position of connector 201 as FIG. 23 from a slightly different perspective. From FIG. 24 it can clearly be derived how locking surface 208 interacts with the second locking nose 316 to prevent connector 201 from being pulled further to the right and out of mating engagement with counter connector 300. As one can further derive from FIGS. 23 and 24, the latching mechanism between the connector and counter connector provided by elements 216 and 306 is released, so that the connector 201 is only held by means of elements 208 and 316. In the so-called second locking position shown in FIGS. 23 and 24 an electrical contact is closed inside of the connector system so that the signal line may send a signal to a corresponding control device, which then disrupts or shuts-off the electrical power supply of the electrical circuit. Since the unmating process is inevitably stopped by means of the guide means 318, guide elements 209 and second stop nose 316, it is not possible to unmate the connector with a single movement or stroke from the connector, at least not under normal operating conditions. The mating process will in any case stop in the second locking position until an operator actuates the actuating arm again and pushes end 205 downwardly in the position shown in FIGS. 24 and 25.

Figure 25:
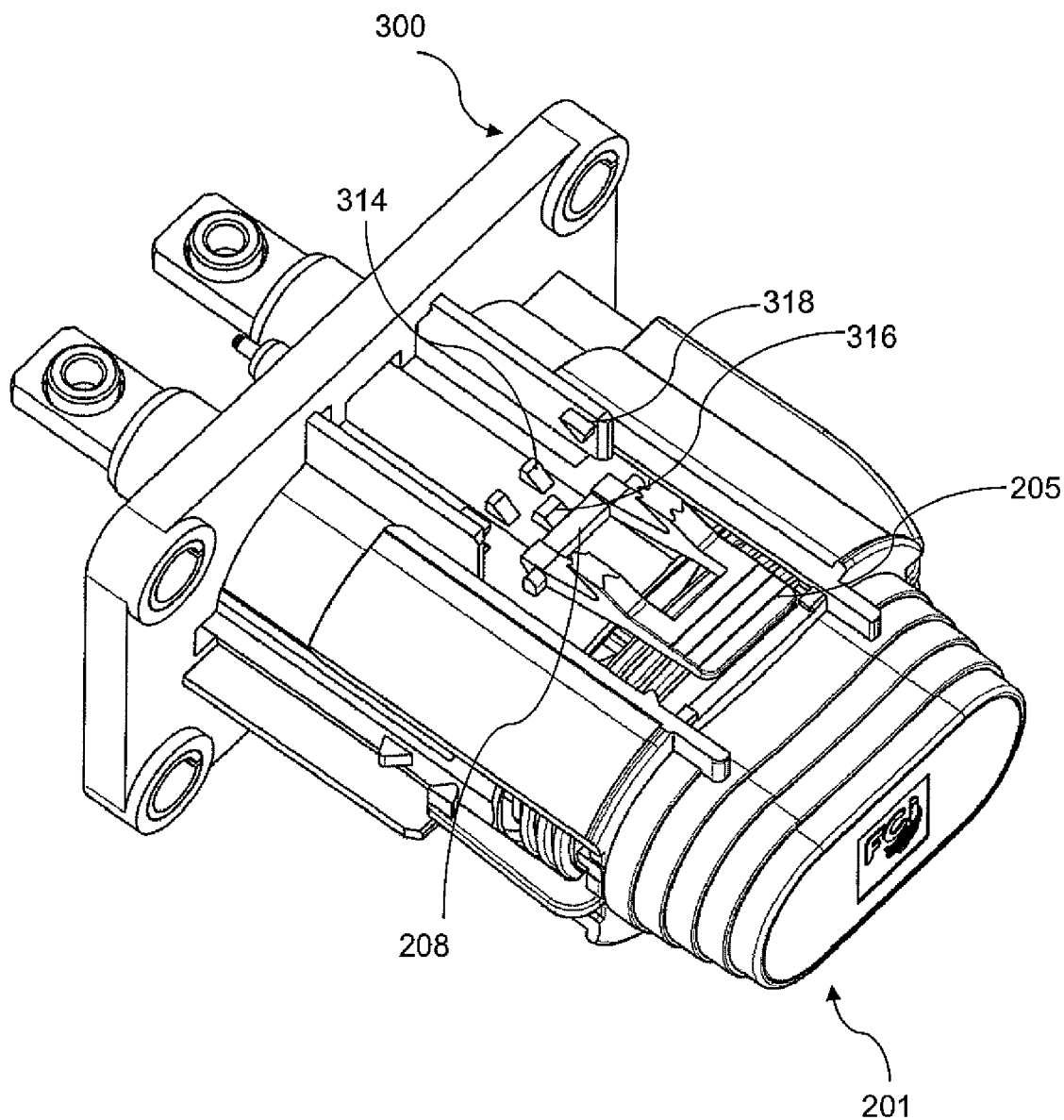
FIG. 25 is another view of the connector system of the present invention in fully unlocked condition.
Figure 26:
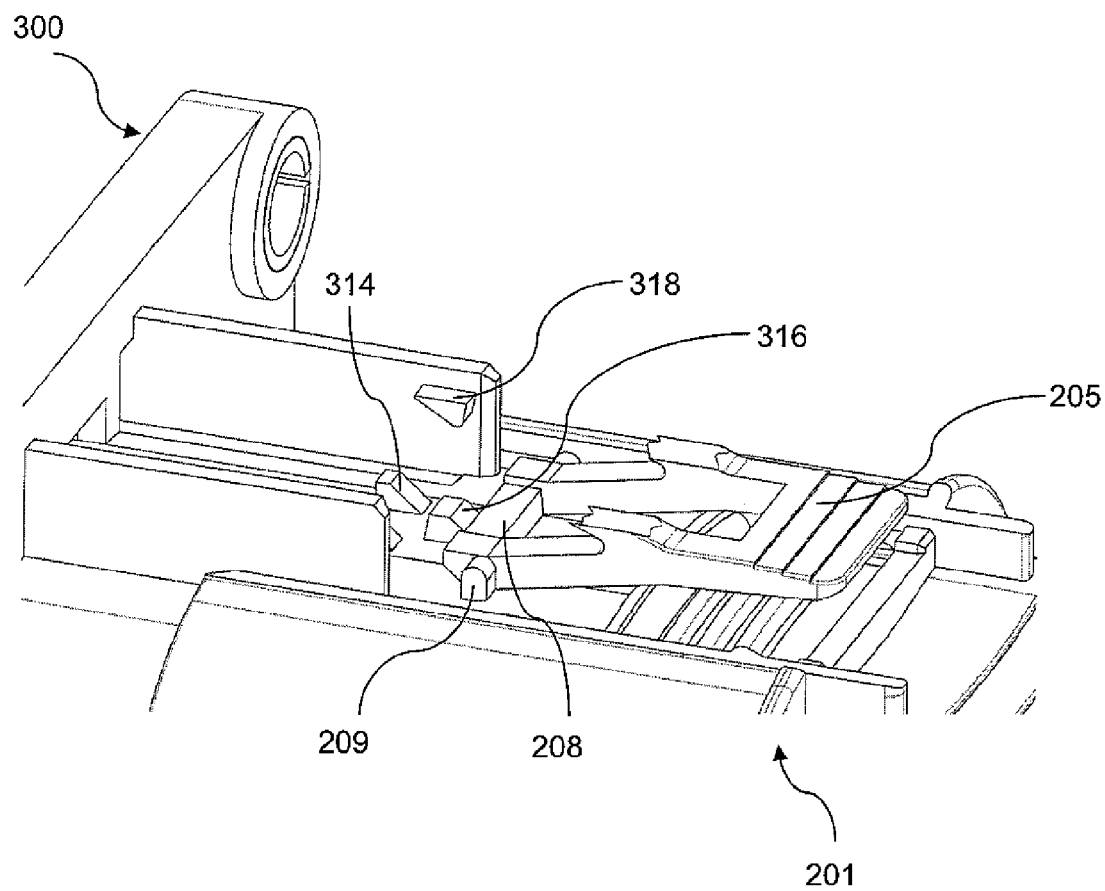
FIG. 26 is a detail of the locking mechanism of FIG. 25.

FIGS. 25 and 26 show the fully unlocked position after an operator has pushed end 205 of actuating arm 204 for a second time to overcome the engagement between locking surface 208 and second locking nose 316. In the position in FIGS. 25 and 26, the connector 201 can now be fully unmated from the counter connector. However, since the unmating process was stopped in the second locking position the unmating process lasts for example 0.5 to up to 1 second longer than without stop, which time is sufficient to shut down the electrical power so that no arching will occur upon full unmating of connector 201 from counter connector 300.

The connector 201 shown in the illustrations 17 to 26 is a service plug, which closes the electrical power circuit of a passenger vehicle when in mated condition, and in particular of a hybrid-fuel driven vehicle or an electrical vehicle. Upon unmating, the electrical circuitry is disrupted and it is safe to for example work on the vehicle. The service plug is safe and easy to use and offers the possibility to safely shut-down the electrical power system of a vehicle without the need for any extra training or instructions. The unmating process of the service plug is natural and does not require any training for an operator. The locking mechanism is completely covered by the hood 202, so that a misuse is practically not possible. The construction is such, that the umating process is inevitably stopped in the second locking position, but at the same time the construction is so simple that even untrained operators will overcome also the second locking in a natural manner, namely by simply actuating again the same actuating arm by means it was possible to move the connector from the first to the second position. Thus, an operator does not need to look or feel for a further release mechanisms but he simply has to repeat the motion and actions he successfully applied for overcoming the first locking position. This comes natural for most people and is in practice the first action people will try upon noticing that the unmating process is stopped (in the second locking position).

Alternatively, it is possible to dimension the actuating arm 204 and the locking means so that it may be broken upon using sufficient force, which may be necessary in case of a car accident in which for example emergency personal may have to use tools or extreme force to unmate connector and counter connector. Thus, the service plug according to this invention still functions, even if damaged, since the electrical circuitry will in any case be disrupted after unmating of the service plug, even if the plug is destroyed in the unmating process. This is a significant advantage compared to a power switch, the destruction of which does not necessarily lead to an interruption of a power circuit. The service plug however, will work even under the most severe conditions.

The invention claimed is:

1. A method for unmating an electrical connector assembly comprising a first connector accommodating a first power contact, a second connector accommodating a second power contact, a first interlocking contact and a second interlocking contact accommodated in the first connector or in the second connector, connection of the interlocking contacts to each other being intended to close a power switch and disconnection of the interlocking contacts to each other being intended to open a power switch, for respectively connecting or disconnecting an electrical power source to the power contacts, the method comprising:
   a step wherein the first and second connectors are unmated along a mating axis, and
   a step wherein movement for unmating the first and second connectors is temporarily blocked after the interlocking contacts are disconnected and before the power contacts are disconnected.

2. The method according to claim 1, wherein unblocking means are actuated for unblocking the unmating movement so as to disconnect the power contacts after the first and second connectors has been temporarily blocked during the unmating movement and after interlocking contacts are disconnected.

3. The method according to claim 2, wherein the unblocking means unblocks a slider having a tubular shape along the mating axis and the unblocking means comprises a button hinged to the slider and adapted to be pushed along a direction perpendicular to the mating axis.

4. The method according to claim 3, wherein the slider is blocked in the mated position of the first and second connectors by blocking means which are located on the slider at a different location from the unblocking means.

5. The method according to claim 1,
   wherein the first and second connectors are mated through a unique plugging movement along a mating axis (XX') and unmated along the same mating axis, this unique plugging movement comprising a first and second plugging movement portions,
   and wherein,
   on the first plugging movement portion, the first and second power contacts are in an electrical connection state chosen amongst an electrically connected state and an electrically disconnected state, while the first and second interlocking contacts are not electrically connected,
   on the second plugging movement portion, the first and second power contacts are electrically connected, while the first and second interlocking contacts are also electrically connected.

6. The method according to claim 5, wherein a third plugging movement portion is intercalated between the first and second plugging portions, the first, second and third plugging movement portions forming the unique plugging movement along the mating axis (XX'), and wherein safety means ensures that the first and second power contacts are electrically connected, while the first and second interlocking contacts are not electrically connected.

7. An electrical connector assembly comprising a first connector accommodating a first power contact, and a second connector accommodating a second power contact, the first and second connectors being able to mate and unmate along a mating axis (XX'), in order to connect and disconnect the first and second power contacts,
- a first interlocking contact and a second interlocking contact accommodated in the first connector or in the second connector, connection of the interlocking contacts to each other being designed to close a power switch and disconnection of the interlocking contacts to each other being intended to open a power switch, for respectively connecting or disconnecting an electrical power source to the power contacts,
- blocking means so as to temporarily block unmating after interlocking contacts are disconnected and before the power contacts are disconnected during the unmating movement of the first and second connectors.

8. The electrical connector assembly according to claim 7, comprising unblocking means that can be actuated for unblocking the unmating movement so as to disconnect the power contacts after the first and second connectors has been temporarily blocked during the unmating movement and after interlocking contacts are disconnected.

9. The electrical connector assembly according to claim 8, wherein the unblocking means comprises an unblocking element actionable by an operator with a movement that is different from a translation along the mating axis (XX') away from the first connector.

10. The electrical connector assembly according to claim 7, comprising a slider having a tubular shape along the mating axis and the unblocking means comprises a button hinged to the slider and adapted to be pushed along a direction perpendicular to the mating axis for unblocking the slider.

11. The electrical connector assembly according to claim 10, wherein the slider is blocked in the mated position of the first and second connectors by blocking means which are located on the slider at a different location from the unblocking means, so that the unblocking means is actionable by an operator with a movement that is different from a translation along the mating axis (XX') away from the first connector.

12. The electrical connector assembly according to claim 7, wherein the first connector comprises a first stop, and the second connector comprises a second stop, the first and second stops being aligned along the mating axis (XX') so as to prevent unmating of the first and second connectors.

13. The electrical connector assembly according to claim 12, wherein the second connector comprises shifting means for shifting the second stop with respect to the first stop, transversally with respect to the mating axis (XX'), and blocking means for blocking the shifting means in a blocked position in which the first and second stops are aligned.

14. The electrical connector assembly according to claim 13,
- wherein the second connector comprises a body delimitating an accommodating chamber for the second power contact, and a slider intended to slide along the mating axis (XX') with respect to the body away from the first connector, the slider comprising a third stop,
- wherein the shifting means comprise the slider and the blocking means comprise the third stop and a fourth stop, the third and fourth stops being aligned with each other along the mating axis (XX') so as to block, in the blocked position, the sliding of the slider,
- wherein the unblocking means are intended to shift the third and fourth stops with respect to each other transversally with respect to the mating axis (XX').

15. The electrical connector assembly according to claim 14,
- wherein the unblocking means comprise a flexible arm, on which the fourth stop is fixed,
- wherein the button is intended to push the flexible arm so as to shift the fourth stop with respect to the third stop.

16. The electrical connector assembly according to claim 7,
- wherein the first and second connectors are designed to be mated through a unique plugging movement along a mating axis (XX') and unmated along the same mating axis, this unique plugging movement comprising a first and second plugging movement portions,
- and wherein,
- on the first plugging movement portion, the first and second power contacts are in an electrical connection state chosen amongst an electrically connected state and an electrically disconnected state, while the first and second interlocking contacts are not electrically connected,
- on the second plugging movement portion, the first and second power contacts are electrically connected, while the first and second interlocking contacts are also electrically connected.

17. The electrical connector assembly according to claim 16, comprising connecting means for connecting the two interlock contacts with each other on the third plugging movement portion.

18. The electrical connector assembly according to claim 17, wherein the connecting means comprises, in the second connector, a first resilient arm intended to come into contact with the first interlock contact,
- wherein the first interlock contact comprises a front end towards the second connector, and
- wherein the first connector comprises first separating means for moving the first resilient arm away from the first interlock contact on the third plugging movement portion.

19. The electrical connector according to claim 18, wherein the first separating means comprises a first lug located along the front end.

20. The electrical connector assembly according to claim 17,
- wherein the first connector comprises the second interlock contact, and
- wherein the connecting means comprise, in the second connector, a shorting element for connecting the two interlock contacts with each other.

21. The electrical connector assembly according to claim 17,
- wherein connecting means comprises a shorting element with a central portion connecting two resilient arms, and
- wherein the central portion and the two resilient arms are integral and made in one single piece.

22. The electrical connector assembly according to claim 7, comprising a connector, a corresponding counter connector and locking means to lock connector and counter-connector with each other, which locking means comprises an actuating means for the release of the locking of connector and counter-connector, wherein the locking means further comprises:
first and second locking members designed to engage locking means assigned to the actuating means, whereby the first locking member is designed to interact with the locking means to lock connector and counter-connector in a first locking position and the second locking member is designed to interact with the locking means to lock connector and counter-connector in a second position, wherein upon actuating of the actuating means the locking between connector and counter-connector can be released to move connector and counter-connector from the first to the second locking position and from the second to an unlocked position, and in that
the locking means is released from the second position to the unlocked position upon further actuation of the actuating means.

23. The electrical connector assembly according to claim 22, wherein said further actuation of the actuating means corresponds to the release of the actuating means.

24. The electrical connector assembly according to claim 22, comprising guiding means designed to move the actuating means into its initial position upon movement of the connector out of the first locking position, so that the second locking member interacts with said locking means assigned to the actuating means to lock connector and counter-connector in said second position.

25. The electrical connector assembly according to claim 24, wherein upon movement of the connector out of the first locking position, the guiding means engages a part of the actuating means and forces it into its non-actuated position, so that upon reaching the second locking position the locking element assigned to the actuating means interacts with the second locking member to prevent a further movement of connector and counter-connector into a fully un-mated condition.

26. The electrical connector assembly according to claim 22, wherein the first locking position is spaced from the second position in the mating direction of connector and counter-connector.

27. The electrical connector assembly according to claim 26, wherein the actuating means is an actuating arm being attached to one of connector or counter-connector and the locking members are protrusions provided on the respective other of connector or counter-connector.

28. The electrical connector assembly according to claim 27, wherein the actuating arm is attached to the connector so that it can be moved from an actuated position in which the first, respectively the second, locking members and the locking means are released and an initial position in which the first, respectively the second, locking members and the locking means are engaged and lock connector and counter-connector with each other.

29. The electrical connector assembly according to claim 22, wherein the connector and counter-connector are provided with latching means.

30. The electrical connector assembly according to claim 29, wherein upon movement of the connector and counter-connector from the first to the second locking position the latching means are released.

31. The electrical connector assembly according to claim 22, wherein power contacts are designed to be in contact with each other in the first and the second locking position of connector and counter-connector.

32. The electrical connector assembly according to claim 22, wherein the interlock contacts are adapted to detect the movement of the connector out of the first locking position into the second locking position.

33. The electrical connector assembly according to claim 22, wherein the connector is a service plug for an electrical power circuit of a passenger vehicle, comprising a housing and two electrical contact terminals being arranged inside a housing and electrically coupled with each other inside of the housing, and the counter-connector is a corresponding service socket comprising two electrical power lines which in the coupled condition of service plug and socket are electrically connected by means of the service plug and which are electrically disconnected in the un-coupled condition of the service plug.

* * * * *